United States Patent
Eriksson Löwenmark et al.

(10) Patent No.: US 9,673,891 B2
(45) Date of Patent: Jun. 6, 2017

(54) CODE DIVISION MULTIPLE ACCESS (CDMA) OVERLAY TO OTHER MULTIPLEXING SCHEME

(71) Applicant: TELEFONAKTIEBOLAGET L M ERICSSON (PUBL), Stockholm (SE)

(72) Inventors: Stefan Eriksson Löwenmark, Färentuna (SE); Mårten Sundberg, Årsta (SE); Miguel Lopez, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 36 days.

(21) Appl. No.: 14/706,887

(22) Filed: May 7, 2015

(65) Prior Publication Data

US 2015/0326308 A1 Nov. 12, 2015

Related U.S. Application Data

(60) Provisional application No. 61/991,413, filed on May 9, 2014.

(51) Int. Cl.
| | | |
|---|---|---|
| H04L 5/00 | (2006.01) | |
| H04B 7/26 | (2006.01) | |
| H04L 1/00 | (2006.01) | |
| H04J 13/12 | (2011.01) | |
| H04B 1/707 | (2011.01) | |
| H04J 13/00 | (2011.01) | |
| H04J 13/18 | (2011.01) | |
| H04L 1/08 | (2006.01) | |

(52) U.S. Cl.
CPC .......... *H04B 7/2668* (2013.01); *H04B 1/707* (2013.01); *H04B 7/2618* (2013.01); *H04J 13/004* (2013.01); *H04J 13/12* (2013.01); *H04J 13/18* (2013.01); *H04L 1/0065* (2013.01); *H04L 1/08* (2013.01); *H04L 5/0003* (2013.01); *H04J 13/0048* (2013.01)

(58) Field of Classification Search
None
See application file for complete search history.

(56) References Cited

U.S. PATENT DOCUMENTS

| | | | |
|---|---|---|---|
| 2009/0279590 A1 | 11/2009 | Lakkis | |
| 2012/0082263 A1* | 4/2012 | Ebrahimi Tazeh Mahalleh ................... H04B 7/0669 375/299 | |
| 2013/0272273 A1 | 10/2013 | Lopez et al. | |

FOREIGN PATENT DOCUMENTS

| | | |
|---|---|---|
| WO | WO 99/05797 A2 | 2/1999 |
| WO | WO 2013/148005 A1 | 10/2013 |

OTHER PUBLICATIONS

3GPP TR 36.888 V12.0.0 (Jun. 2013), 3rd Generation Partnership Project; Technical Specification Group Radio Access Network; Study on provision of low-cost Machine-Type Communications (MTC) User Equipments (UEs) based on LTE (Release 12), RP-60, available Jun. 26, 2013, the whole document.

(Continued)

*Primary Examiner* — Fan Ng

(57) ABSTRACT

A wireless apparatus (e.g., wireless access node, wireless device) and a method are described herein that use a block-wise Code Division Multiple Access (CDMA) scheme overlaid to a Time Division Multiple Access (TDMA) structure to communicate over a physical channel with another wireless apparatus (e.g., wireless device, wireless access node).

12 Claims, 13 Drawing Sheets

(56) References Cited

OTHER PUBLICATIONS

3GPP TS 45.005 V12.0.0 (Aug. 2013), 3rd Generation Partnership Project; Technical Specification Group GSM/EDGE Radio Access Network; Radio transmission and reception (Release 12), GP-59, available Sep. 19, 2013, the whole document.

3GPP TR 45.860 V11.5.0 (Nov. 2012), 3rd Generation Partnership Project; Technical Specification Group GSM/EDGE Radio Access Network; Signal Precoding Enhancements for EGPRS2 DL (Release 11), GP-56, available Dec. 20, 2012, the whole document.

Ericsson: "GSM Evolution for cellular Iot-Increasing UL capacity", 3GPP Draft; GP-140609, GSM Evolution for Cellular IOT—Increasing UL Capacity, 3rd Generation Partnership Project (3GPP), Mobile Competence Centre; 650, Route Des Lucioles; F-06921 Sophia-Antipolis vol. TSG Geran. No. Ljubljana. Slovenia; Aug. 25-29, 2014, Section 3 "Proposal".

Ericsson LM: 3GPP Draft; GP-140883—GSM Evolution for Cellular IOT—Increasing UL Capacity (Update of GP-140609). 3rd Generation Partnership Project (3GPP). Mobile Competence Centre; 650, Route Des Lucioles; vol. TSG Geran. No. San Francisco. USA; Nov. 17-21, 2014, Section 3 "Proposal".

\* cited by examiner

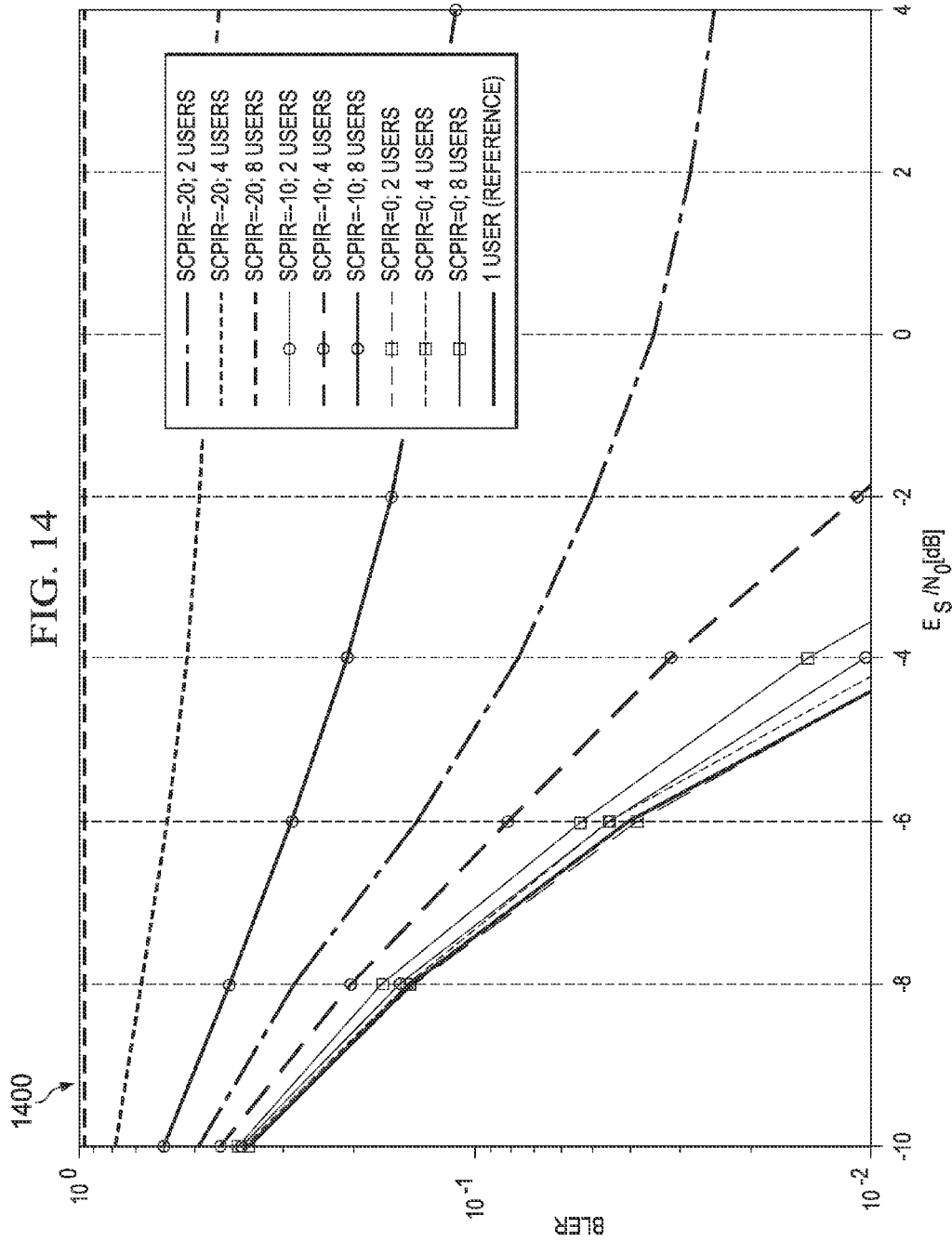

CODE DIVISION MULTIPLE ACCESS (CDMA) OVERLAY TO OTHER MULTIPLEXING SCHEME

CLAIM OF PRIORITY

This application claims the benefit of priority to U.S. Provisional Application No. 61/991,413, filed on May 9, 2014, the entire contents of which are hereby incorporated by reference for all purposes.

TECHNICAL FIELD

The present disclosure relates to a wireless apparatus (e.g., wireless access node, wireless device) and a method for communicating over a physical channel with another wireless apparatus (e.g., wireless device, wireless access node). In one example, the wireless apparatus (e.g., wireless access node, wireless device) and the method use a block-wise Code Division Multiple Access (CDMA) scheme overlaid to a Time Division Multiple Access (TDMA) structure to communicate over the physical channel with another wireless apparatus (e.g., wireless device, wireless access node).

BACKGROUND

The following abbreviations and terms are herewith defined, at least some of which are referred to within the following description of the present disclosure.
3GPP 3rd-Generation Partnership Project
BLER Block Error Ratio
ASIC Application Specific Integrated Circuit
BTTI Basic TTI
CDMA Code Division Multiple Access
DFT Discrete Fourier Transform
DL Downlink
DSP Digital Signal Processor
EDGE Enhanced Data rates for GSM Evolution
EGPRS Enhanced General Packet Radio Service
FDMA Frequency Division Multiple Access
FN Frame Number
GSM Global System for Mobile Communications
IMSI International Mobile Subscriber Identity
MISO Multiple Input Single Output
MTC Machine Type Communications
LTE Long-Term Evolution
OFDMA Orthogonal Frequency Division Multiple Access
PDN Packet Data Network
RACH Random Access Channel
SCPIR Sub-Channel Power Imbalance Ratio
SIMO Single Input Multiple Output
SNR Signal-to-Noise Ratio
TDMA Time Division Multiple Access
TS Time Slot
TTI Transmission Time Intervals
UE User Equipment
UL Uplink
WCDMA Wideband Code Division Multiple Access
WiMAX Worldwide Interoperability for Microwave Access
Receiver: A wireless apparatus such as a wireless access node (e.g., base station) has a receiver to receive signals over a physical channel from one or more other wireless apparatuses such as wireless devices (e.g., users, mobile stations). Likewise, the wireless devices (e.g., users, mobile stations) each have a receiver to receive a multiplexed signal over the physical channel from the wireless access node (e.g., base station).
Transmitter: A wireless apparatus such as a wireless access node (e.g., base station) has a transmitter to transmit a multiplexed signal over a physical channel to one or more other wireless apparatuses such as wireless devices (e.g., users, mobile stations). Likewise, the wireless devices (e.g., users, mobile stations) each have a transmitter to transmit a signal over the physical channel to the wireless access node (e.g., base station).

Existing radio access technologies deploy different multiplexing (multiple) access schemes to divide the radio spectrum among multiple users (e.g., mobile stations). For example, Global System for Mobile Communications (GSM) utilizes Time Division Multiple Access (TDMA) and Frequency Division Multiple Access (FDMA) to divide the radio spectrum among multiple users (e.g., mobile stations). Long-Term Evolution (LTE) utilizes TDMA and Orthogonal Frequency Division Multiple Access (OFDMA) to divide the radio spectrum among multiple users (e.g., mobile stations).

When the multiplexing (multiple) access scheme has a TDMA component, the transmitted signal is divided into blocks, which may be transmitted sequentially in time on the same channel to different receivers. The multiplexing is provided by alternating between blocks to different receivers.

On most radio channels, the transmitted signal is distorted by the channel propagation before the transmitted signal reaches the receiver. The channel may, for example, add time dispersion and/or attenuation to the transmitted signal. Typically, the impact of this distortion varies with time, e.g., due to movement of the transmitter and/or the receiver. In addition, the transmitter and receiver may themselves introduce random changes in the phase of the signal from one block to the next.

In some situations, e.g., when the transmitter and receiver are stationary, the channel variations are very slow or even non-existent. In such scenarios, a conventional technique to increase the coverage is to use block repetition on the transmitter side and coherent accumulation of multiple received signal samples on the receiver side. For coherent combining, the phase of the transmitted blocks generally needs to remain the same or change in a known way.

With block repetition, the signal-to-noise ratio (SNR) after coherent combining will increase as 10*log 10(N), where N is the number of repetitions.

Block repetition has been proposed, for example, in LTE in order to achieve coverage increases of up to 15-20 dB for Machine Type Communications (MTC), as described in the 3rd-Generation Partnership Project (3GPP) TR 36.888 V12.0.0 Technical Report "Study on provision of low-cost Machine-Type Communications (MTC) User Equipments (UEs) based on LTE." The contents of the 3GPP TR 36.888 V12.0.0 Technical Report are hereby incorporated by reference for all purposes. The same principle would equally apply to, for example, GSM to achieve coverage improvements.

However, while block repetition increases the effective SNR, block repetition also reduces the capacity of the channel. The capacity of the channel is inversely proportional to the number of repetitions N. Therefore, there is a need in multi-user multiplexing techniques to increase the coverage while maintaining capacity of the channel. This need and other needs are addressed by the present disclosure.

SUMMARY

A wireless apparatus (e.g., wireless access node, wireless device) and a method for communicating over a physical channel with another wireless apparatus (e.g., wireless device, wireless access node) are described in the independent claims. Advantageous embodiments of the wireless apparatus (e.g., wireless access node, wireless device) and the method are further described in the dependent claims.

In one aspect, the present disclosure provides a wireless apparatus configured to communicate over a physical channel with another wireless apparatus. The wireless apparatus comprises a processor and at least one memory that stores processor-executable instructions, wherein the processor interfaces with the at least one memory to execute the processor-executable instructions, whereby the wireless apparatus is operable to perform an obtain operation, a generate operation, a divide operation, a repeat operation, a multiply operation, and a transmit operation. In the obtain operation, the wireless apparatus is operable to obtain code bits for the another wireless apparatus. In the generate operation, the wireless apparatus is operable to generate a baseband signal using the code bits. In the divide operation, the wireless apparatus is operable to divide the baseband signal into a plurality of blocks, wherein each block contains one or more time division units. In the repeat operation, the wireless apparatus is operable to repeat N times each block of the plurality of blocks to generate a plurality of sequences of N repeated blocks. In the multiply operation, the wireless apparatus is operable to multiply each of the plurality of sequences of the N repeated blocks by a code word of length N selected from a set of orthogonal code words to generate a plurality of sequences of the multiplied N repeated blocks. In the transmit operation, the wireless apparatus is operable to transmit the plurality of sequences of the multiplied N repeated blocks to the another wireless apparatus. The wireless apparatus operable to operate in this manner will address a problem in the state-of-the-art by effectively increasing the coverage while maintaining capacity of the channel.

In another aspect, the present disclosure provides a method in a wireless apparatus for communicating over a physical channel with another wireless apparatus. The method comprises an obtaining step, a generating step, a dividing step, a repeating step, a multiplying step, and a transmitting step. In the obtaining step, the wireless apparatus obtains code bits for the another wireless apparatus. In the generating step, the wireless apparatus generates a baseband signal using the code bits. In the dividing step, the wireless apparatus divides the baseband signal into a plurality of blocks, wherein each block contains one or more time division units. In the repeating step, the wireless apparatus repeats N times each block of the plurality of blocks to generate a plurality of sequences of N repeated blocks. In the multiplying step, the wireless apparatus multiplies each of the plurality of sequences of the N repeated blocks by a code word of length N selected from a set of orthogonal code words to generate a plurality of sequences of the multiplied N repeated blocks. In the transmitting step, the wireless apparatus transmits the plurality of sequences of the multiplied N repeated blocks to the another wireless apparatus. The wireless apparatus by implementing this method will address a problem in the state-of-the-art by effectively increasing the coverage while maintaining capacity of the channel.

In yet another aspect, the present disclosure provides a wireless apparatus configured to communicate over a physical channel with another wireless apparatus. The wireless apparatus comprises a processor and at least one memory that stores processor-executable instructions, wherein the processor interfaces with the at least one memory to execute the processor-executable instructions, whereby the wireless apparatus is operable to perform a receive operation, a buffer operation, an obtain operation, a multiply operation, and an accumulate operation. In the receive operation, the wireless apparatus is operable to receive a signal from the another wireless apparatus. In the buffer operation, the wireless apparatus is operable to buffer the received signal which includes a plurality of sequences of multiplied N repeated blocks. In the obtain operation, the wireless apparatus is operable to obtain information indicating (1) a number of repetitions (N) of blocks in the received signal, and (2) a code word of length N selected from a set of orthogonal code words. In the multiply operation, the wireless apparatus is operable to multiply each of the plurality of sequences of the multiplied N repeated blocks by a conjugate of the obtained code word of length N selected from the set of orthogonal code words to generate a plurality of multiplied sequences of the multiplied N repeated blocks. In the accumulate operation, the wireless apparatus is operable to accumulate each of the plurality of multiplied sequences of the multiplied N repeated blocks. The wireless apparatus configured to operate in this manner will address a problem in the state-of-the-art by effectively increasing the coverage while maintaining capacity of the channel.

In still yet another aspect, the present disclosure provides a method in a wireless apparatus configured for communicating over a physical channel with another wireless apparatus. The method comprises a receiving step, a buffering step, an obtaining step, a multiplying step, and an accumulating step. In the receiving step, the wireless apparatus receives a signal from the another wireless apparatus. In the buffering step, the wireless apparatus buffers the received signal which includes a plurality of sequences of multiplied N repeated blocks. In the obtaining step, the wireless apparatus obtains information indicating (1) a number of repetitions (N) of blocks in the received signal, and (2) a code word of length N selected from a set of orthogonal code words. In the multiplying step, the wireless apparatus multiplies each of the plurality of sequences of the multiplied N repeated blocks by a conjugate of the obtained code word of length N selected from the set of orthogonal code words to generate a plurality of multiplied sequences of the multiplied N repeated blocks. In the accumulating step, the wireless apparatus accumulates each of the plurality of multiplied sequences of the multiplied N repeated blocks. The wireless apparatus by implementing this method will address a problem in the state-of-the-art by effectively increasing the coverage while maintaining capacity of the channel.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIG. 14 is a simulation graph illustrating user performance at the TUx channel for a different number of users (speed=30 km/h) and different power imbalances in accordance with an embodiment of the present disclosure.

DETAILED DESCRIPTION

Figure 1:
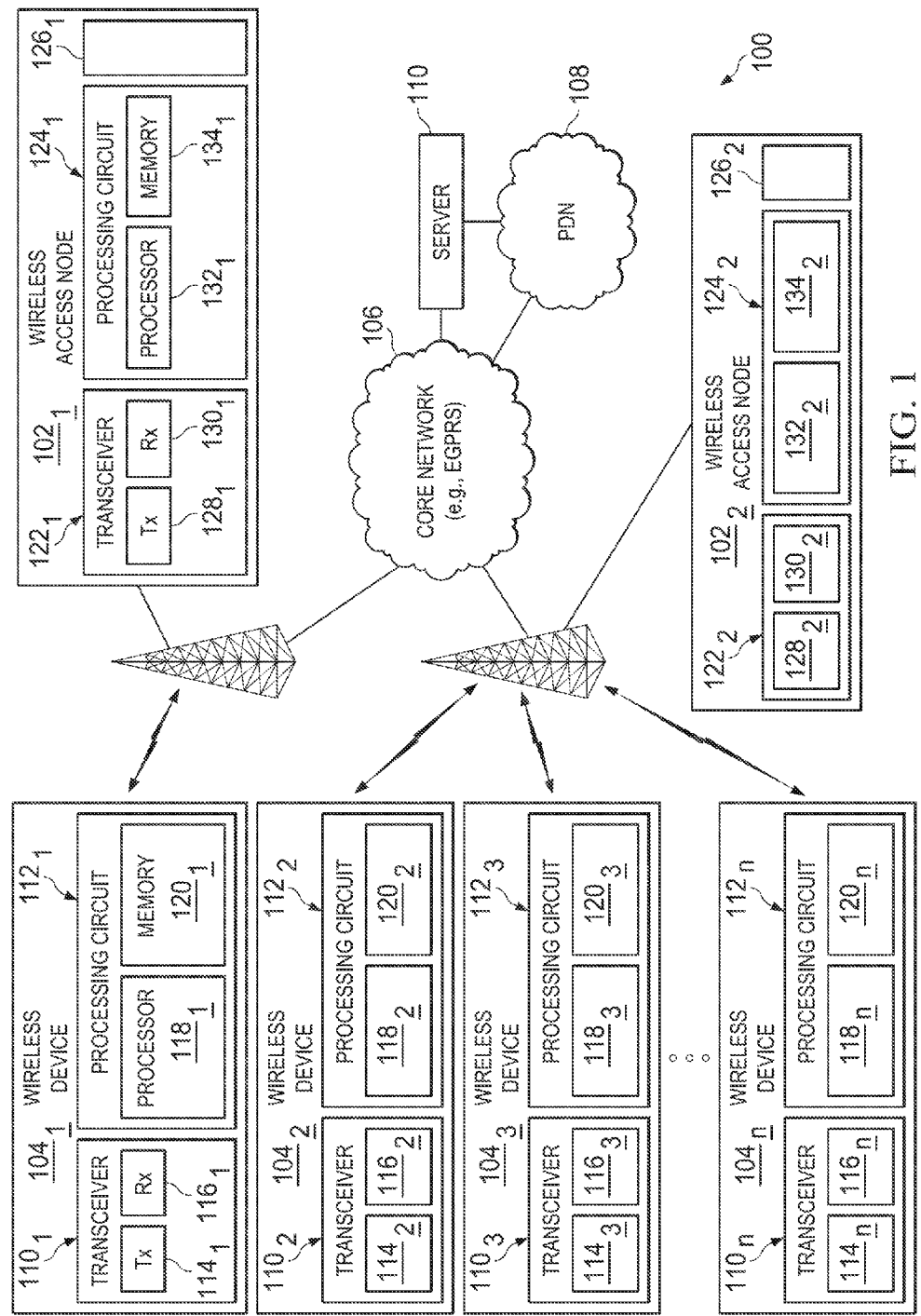
FIG. 1 is a diagram of an exemplary wireless communication network in accordance with the present disclosure.

To describe the technical features of the present disclosure, a discussion is provided first to describe an exemplary wireless communication network which includes multiple wireless devices and multiple wireless access nodes each of which comprises a receiver and a transmitter that are configured in accordance with the present disclosure (see FIG. 1). Then, a discussion is provided to explain the functionality of the receiver and transmitter in accordance with the present disclosure (see FIGS. 2-7). Thereafter, a discussion is provided to explain in more detail various concepts associated with the functionality of the receiver and transmitter of the present disclosure. Then, a discussion is provided to describe how the present disclosure can be applied to a GSM application (see FIGS. 6-14). Finally, a discussion is provided to describe a Hadamard transform (matrix).

Exemplary Wireless Communication Network 100

Referring to FIG. 1, there is illustrated an exemplary wireless communication network 100 in accordance with the present disclosure. The wireless communication network 100 includes multiple wireless access nodes $102_1$ and $102_2$ (only two illustrated), multiple wireless devices $104_1$, $104_2$, $104_3$ . . . $104_n$, and a core network 106 (e.g., EGPRS core network 106). The wireless communication network 100 also includes many well-known components, but for clarity, only the components needed to describe the features of the present disclosure are described herein. Further, the wireless communication network 100 is described herein as being an GSM/EGPRS wireless communication network 100 which is also known as an EDGE wireless communication network 100. However, those skilled in the art will readily appreciate that the techniques of the present disclosure, which are applied to the GSM/EGPRS wireless communication network 100, are generally applicable to other types of wireless communication systems, including, for example, WCDMA, LTE, and WiMAX systems.

The wireless communication network 100 includes the wireless access nodes $102_1$ and $102_2$ (only two illustrated) which provide network access to the wireless devices $104_1$, $104_2$, $104_3$ . . . $104_n$. In this example, the wireless access node $102_1$ is providing network access to wireless device $104_1$ while the wireless access node $102_2$ is providing network access to wireless devices $104_2$, $104_3$ . . . $104_n$. The wireless access nodes $102_1$ and $102_2$ are connected to the core network 106 (e.g., EGPRS core network 106). The core network 106 is connected to an external Packet Data Network (PDN) 108, such as the Internet, and a server 110 (only one illustrated). The wireless devices $104_1$, $104_2$, $104_3$ . . . $104_n$ may communicate with one or more servers 110 (only one illustrated) connected to the core network 106 and/or the PDN 108.

The wireless devices $104_1$, $104_2$, $104_3$ . . . $104_n$ may refer generally to an end terminal (user) that attaches to the wireless communication network 100, and may refer to either a Machine Type Communications (MTC) device or a non-MTC device. Further, the term "wireless device" is generally intended to be synonymous with the term "User Equipment," or UE, as that term is used by the 3rd-Generation Partnership Project (3GPP), and includes stand-alone wireless devices, such as terminals, cell phones, smart phones, tablets, and wireless-equipped personal digital assistants, as well as wireless cards or modules that are designed for attachment to or insertion into another electronic device, such as a personal computer, electrical meter, etc.

Likewise, the wireless access nodes $102_1$ and $102_2$ may refer in general to a base station or central node in the wireless communication network 100, and may refer to wireless access nodes $102_1$ and $102_2$ that are controlled by a physically distinct radio network controller as well as to more autonomous access points, such as the so-called evolved Node Bs (eNodeBs) in Long-Term Evolution (LTE) networks.

Each wireless device $104_1$, $104_2$, $104_3$ . . . $104_n$ may include a transceiver circuit $110_1$, $110_2$, $110_3$ . . . $110_n$ for communicating with the wireless access nodes $102_1$ and $102_2$, and a processing circuit $112_1$, $112_2$, $112_3$ ... $112_n$ for processing signals transmitted from and received by the transceiver circuit $110_1$, $110_2$, $110_3$ ... $110_n$ and for controlling the operation of the corresponding wireless device $104_1$, $104_2$, $104_3$ ... $104_n$. The transceiver circuit $110_1$, $110_2$, $110_3$ ... $110_n$ may include a transmitter $114_1$, $114_2$, $114_3$ ... $114_n$ and a receiver $116_1$, $116_2$, $116_3$ ... $116_n$, which may operate according to any standard, e.g., the GSM/EDGE standard. The processing circuit $112_1$, $112_2$, $112_3$ ... $112_n$ may include a processor $118_1$, $118_2$, $118_3$ ... $118_n$ and a memory $120_1$, $120_2$, $120_3$ ... $120_n$ for storing program code for controlling the operation of the corresponding wireless device $104_1$, $104_2$, $104_3$ ... $104_n$. The program code may include code for performing the procedures (e.g., block formatting, block repeating, phase shifting, buffering, serial-to-parallel conversion, and/or accumulating) as described hereinafter.

Each wireless access node $102_1$ and $102_2$ may include a transceiver circuit $122_1$ and $122_2$ for communicating with wireless devices $104_1$, $104_2$, $104_3$ ... $104_n$, a processing circuit $124_1$ and $124_2$ for processing signals transmitted from and received by the transceiver circuit $122_1$ and $122_2$ and for controlling the operation of the corresponding wireless access node $102_1$ and $102_2$, and a network interface $126_1$ and $126_2$ for communicating with the core network $106$. The transceiver circuit $122_1$ and $122_2$ may include a transmitter $128_1$ and $128_2$ and a receiver $130_1$ and $130_2$, which may operate according to any standard, e.g., the GSM/EDGE standard. The processing circuit $124_1$ and $124_2$ may include a processor $132_1$ and $132_2$ and a memory $134_1$ and $134_2$ for storing program code for controlling the operation of the corresponding wireless access node $102_1$ and $102_2$. The program code may include code for performing the procedures (e.g., block formatting, block repeating, phase shifting, buffering, serial-to-parallel conversion, and/or accumulating) as described hereinafter.

Receiver and Transmitter

There are two cases of interest described herein which are as follows:

The uplink (UL) case (e.g., see FIG. 2): the wireless access node $102_2$ has the receiver $130_2$ which receives signals $202_2$, $202_3$ ... $202_n$ on a physical channel $204$ from the transmitters $114_2$, $114_3$ ... $114_n$ of the wireless devices $104_2$, $104_3$ ... $104_n$.

The downlink (DL) case (e.g., see FIG. 3): the wireless access node $102_2$ has the transmitter $128_2$ which transmits a multiplexed signal $206$ on a physical channel $208$ to the receivers $116_2$, $116_3$ ... $116_n$ of the wireless devices $104_2$, $104_3$ ... $104_n$.

In both cases, the wireless access node $102_2$ and wireless devices $104_2$, $104_3$ ... $104_n$ have transmitters $128_2$, $114_2$, $114_3$ ... $114_n$ which function as discussed below with respect to FIGS. 4-5. Further, the wireless access node $102_2$ and wireless devices $104_2$, $104_3$ ... $104_n$ have receivers $130_2$, $116_2$, $116_3$ ... $116_n$ which function as discussed below with respect to FIGS. 6-7.

Figure 4:
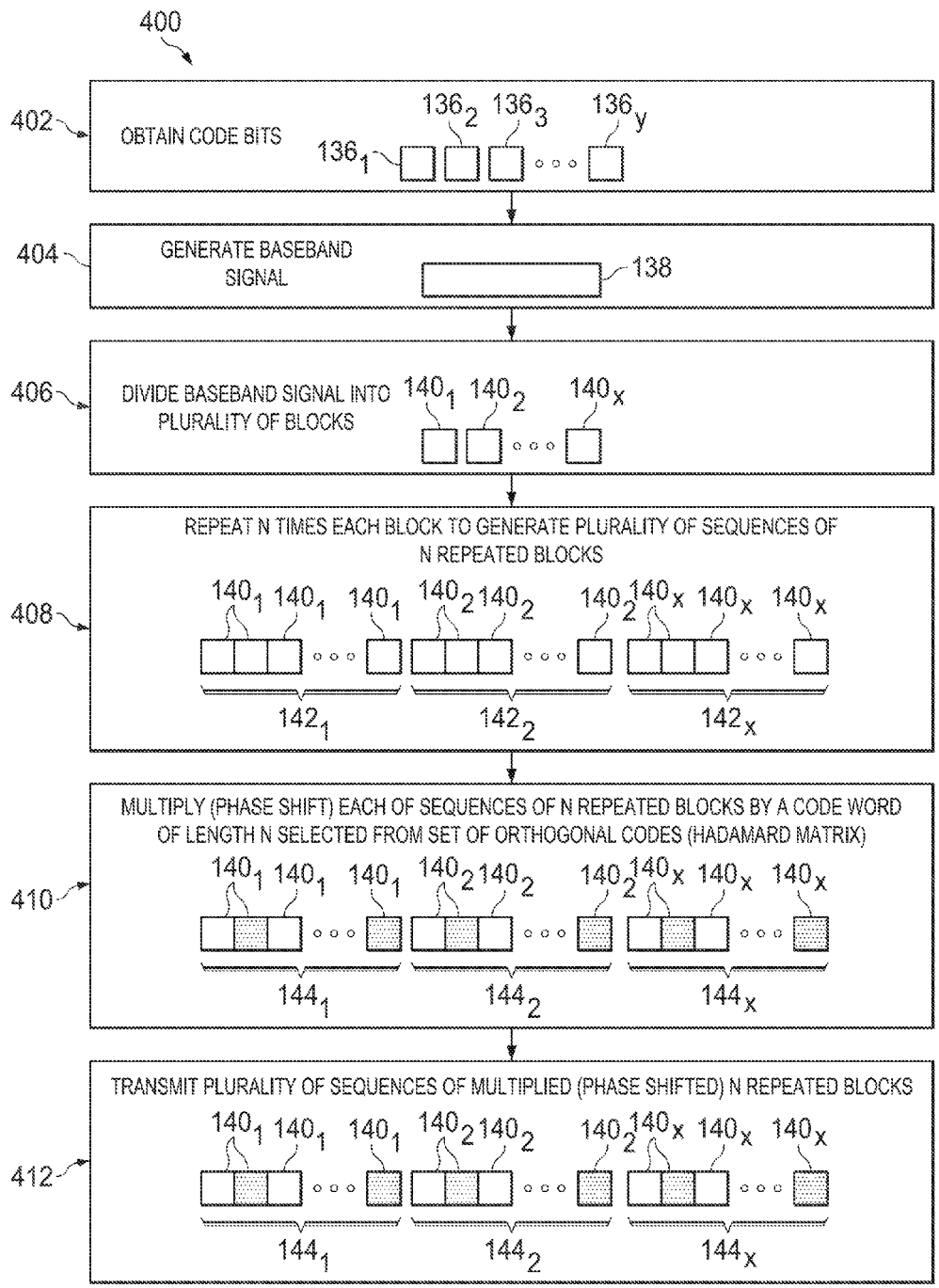
FIG. 4 is a flowchart of a method implemented in a wireless apparatus (wireless access node or wireless device) for transmitting a signal to another wireless apparatus (wireless device or wireless access node) in accordance with an embodiment of the present disclosure.

Referring to FIG. 4, there is a flowchart of a method $400$ in a wireless apparatus $102_2$, $104_2$, $104_3$ ... $104_n$ for transmitting one or more signals $202_2$, $202_3$ ... $202_n$, $206$ to one or more other wireless apparatuses $104_2$, $104_3$ ... $104_n$, $102_2$ in accordance with an embodiment of the present disclosure. At step $402$, the wireless apparatus $102_2$, $104_2$, $104_3$ ... $104_n$ obtains code bits $136_1$, $136_2$, $136_3$ ... $136_y$ for one of the other wireless apparatuses $104_2$, $104_3$ ... $104_n$, $102_2$. At step $404$, the wireless apparatus $102_2$, $104_2$, $104_3$ ... $104_n$ generates a baseband signal $138$ using the code bits $136_1$, $136_2$, $136_3$ ... $136_y$. More specifically, the wireless apparatus $102_2$, $104_2$, $104_3$ ... $104_n$ may generate the baseband signal $138$ according to modulation and formatting requirements (e.g., add training sequence/reference symbols, generate modulation symbols etc. ... ) specific to a radio access technology used by the wireless apparatus $102_2$, $104_2$, $104_3$ ... $104_n$. At step $406$, the wireless apparatus $102_2$, $104_2$, $104_3$ ... $104_n$ divides the baseband signal $138$ (e.g., per a block format K) into a plurality of blocks $140_1$, $140_2$ ... $140_x$, where each block $140_1$, $140_2$ ... $140_x$ contains one or more time division units (discussed in detail below). At step $408$, the wireless apparatus $102_2$, $104_2$, $104_3$ ... $104_n$ repeats N times each block $140_1$, $140_2$ ... $140_x$ to generate a plurality of sequences of N repeated blocks $142_1$, $142_2$ ... $142_x$. At step $410$, the wireless apparatus $102_2$, $104_2$, $104_3$ ... $104_n$ multiplies (e.g., phase shifts) each of the plurality of sequences of the N repeated blocks $142_1$, $142_2$ ... $142_x$ by using a code word of length N selected from a set of orthogonal code words to generate sequences of the multiplied N repeated blocks $144_1$, $144_2$ ... $144_x$. It should be appreciated that multiplying a sequence of N repeated blocks $142_1$, $142_2$ ... $142_x$ by a code word of length N can, in one case, include multiplying the first block by the first entry in the code word, the second block by the second entry in the code word, etc. ... where such multiplication can be implemented, e.g., by means of phase and amplitude shifts of the individual blocks. Further, the code word can be selected from any set of orthogonal code words which can possibly have complex symbols. One possible embodiment, is to use a row (or column) of a Hadamard matrix, the content of which is a real-valued orthogonal code word of unit amplitude. In this case, the multiply operation at step $410$ may be implemented by using the row (or column) of the Hadamard matrix to apply a constant phase shift to each block in the sequences of the N repeated blocks $142_1$, $142_2$ ... $142_x$ to generate sequences of the multiplied N repeated blocks $144_1$, $144_2$ ... $144_x$ (e.g., see FIG. 4, where one phase shift is illustrated as a clear box while another phase shift is illustrated as a shaded box). At step $412$, the wireless apparatus $102_2$, $104_2$, $104_3$ ... $104_n$ transmits the plurality of sequences of the multiplied N repeated blocks $144_1$, $144_2$ ... $144_x$ as one of the signals $202_2$, $202_3$ ... $202_n$, $206$ to the one of the other wireless apparatuses $104_2$, $104_3$ ... $104_n$, $102_2$.

Figure 2:
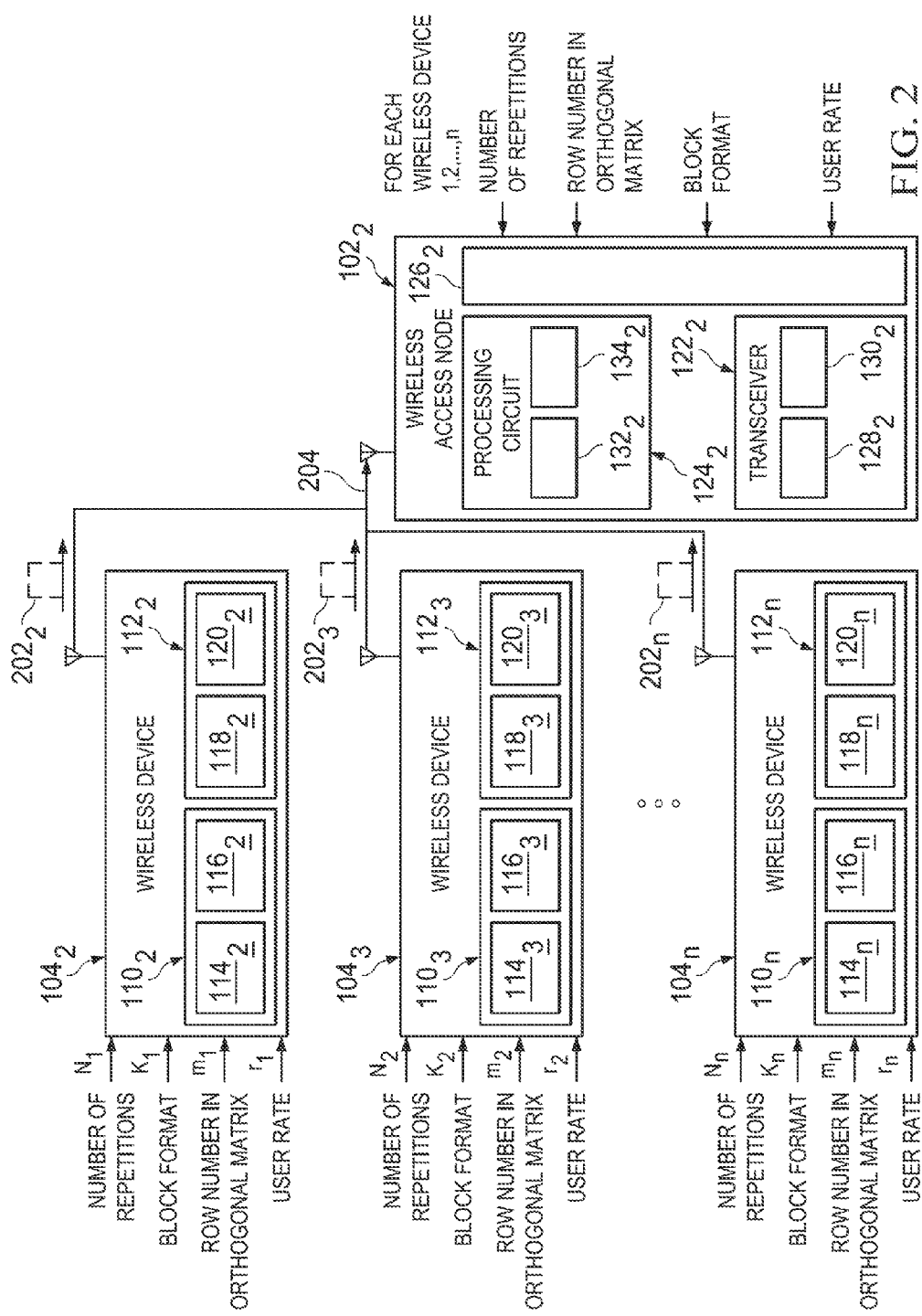
FIG. 2 is a diagram of multiple wireless devices (transmitters) transmitting signals on the same physical channel to one wireless access node (receiver) in accordance with an embodiment of the present disclosure.

In the UL case illustrated in FIG. 2, the wireless apparatus implementing the method $400$ would be one of the wireless devices $104_2$, $104_3$ ... $104_n$ and the other wireless apparatus which receives the transmitted sequences of the multiplied N repeated blocks $144_1$, $144_2$ ... $144_x$ associated with one of the signals $202_2$, $202_3$ ... $202_n$ would be the wireless access node $102_2$ (e.g., base station $102_2$).

Figure 3:
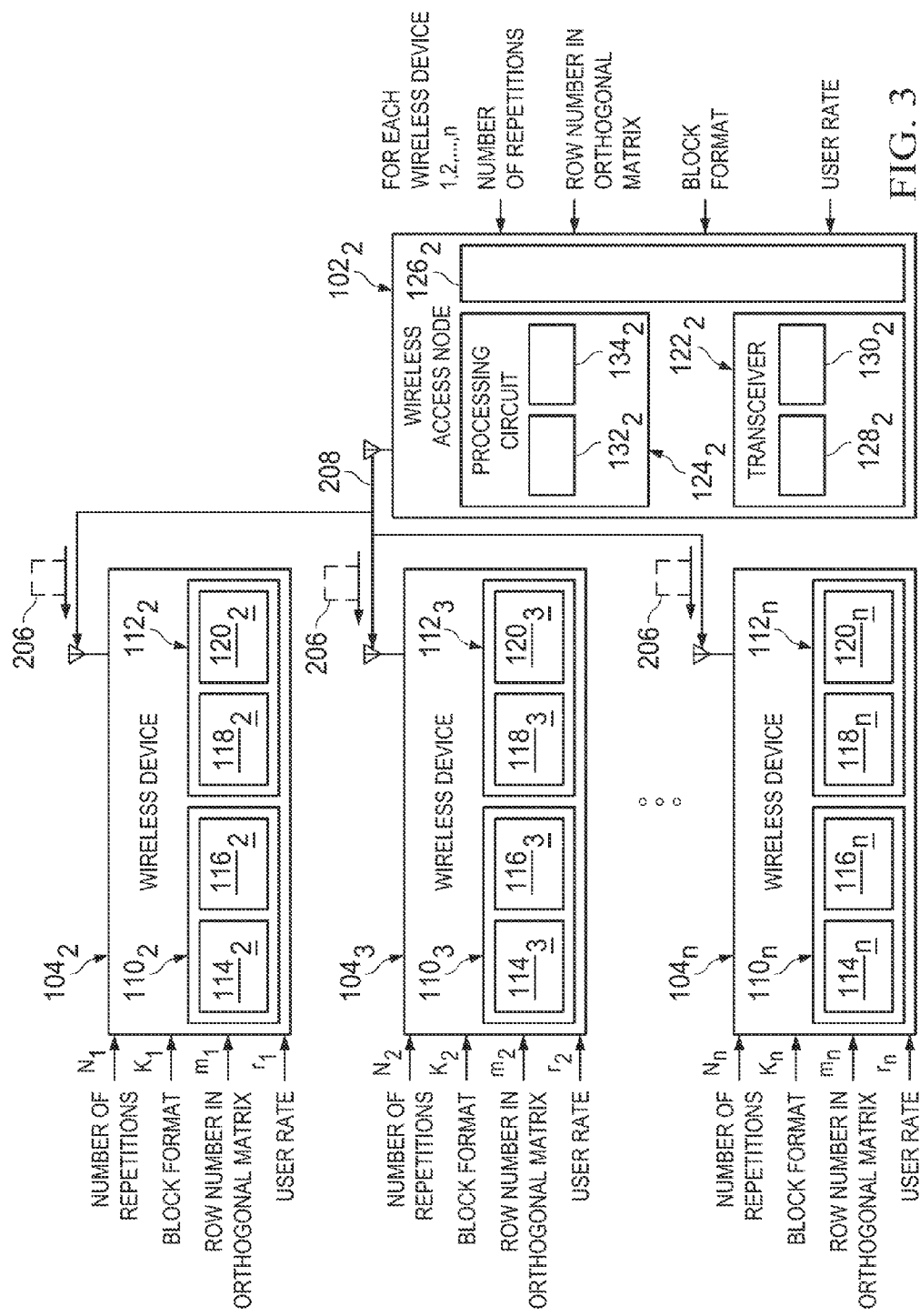
FIG. 3 is a diagram of one wireless access node (transmitter) transmitting a multiplexed signal on the same physical channel to multiple wireless devices (receivers) in accordance with an embodiment of the present disclosure.

In the DL case illustrated in FIG. 3, the wireless apparatus implementing the method $400$ would be the wireless access node $102_2$ (e.g., base station $102_2$) and the other wireless apparatus which receives the transmitted sequences of the multiplied N repeated blocks $144_1$, $144_2$ ... $144_x$ associated with the signal $206$ would be one of the wireless devices $104_2$, $104_3$ ... $104_n$.

In another example, the wireless access node $102_2$ is operable to communicate over the same physical channel $208$ with multiple wireless devices $104_2$, $104_3$ ... $104_n$ by performing steps $402$, $404$, $406$, $408$, $410$ and $412$ for each of the wireless devices $104_2$, $104_3$ ... $104_n$. In particular, the wireless access node $102_2$ would perform the transmit step $412$ once to coherently transmit one multiplexed signal $206$ following the TDMA structure to all of the wireless devices $104_2$, $104_3$ ... $104_n$. Coherent transmission implies that the phase trajectory is the same for each sequence in each repetition of the blocks $142_1$, $142_2$ ... $142_x$ before the orthogonal code word was applied. Further, the wireless access node $102_2$ would perform each of the multiply steps 410 such that each of the wireless devices $104_2$, $104_3$ ... $104_n$ is assigned its own unique code word of length N selected from the set of orthogonal code words. For instance, the wireless access node $102_2$ would perform each of the multiply steps 410 such that each of the wireless devices $104_2$, $104_3$ ... $104_n$ is assigned its own unique row or column from a Hadamard matrix. In addition, the wireless access node $102_2$ is operable to perform the repeat steps 408 such that each of the plurality of blocks associated with one wireless device $104_3$ (for example) is repeated A times to assign a user rate $r_A$ to the wireless device $104_3$ rather than being repeated N times as is for the wireless device $104_2$ (for example) which is assigned a user rate $r_N$. In this situation, the wireless access node $102_2$ would then perform the multiply steps 410 where at least one of the code words of length N is not selected from the set of orthogonal code words in order to maintain orthogonality between the plurality of sequences of the multiplied N repeated blocks $144_1$, $144_2$ ... $144_x$ of the wireless devices $104_2$, $104_3$ ... $104_n$ which have different user rates $r_A$ and $r_N$ (the multi-rate feature is discussed in more detail below). Moreover, the wireless access node $102_2$ is operable to perform the transmit step 412 such that at least one of the plurality of sequences of the multiplied N repeated blocks $144_1$, $144_2$ ... $144_x$ is transmitted at one amplitude to at least one of the wireless devices $104_2$, $104_3$ ... $104_n$ and that at least one of the plurality of sequences of the multiplied N repeated blocks $144_1$, $144_2$ ... $144_x$ is transmitted at another amplitude to at least one of the wireless devices $104_2$, $104_3$ ... $104_n$.

Figure 5:
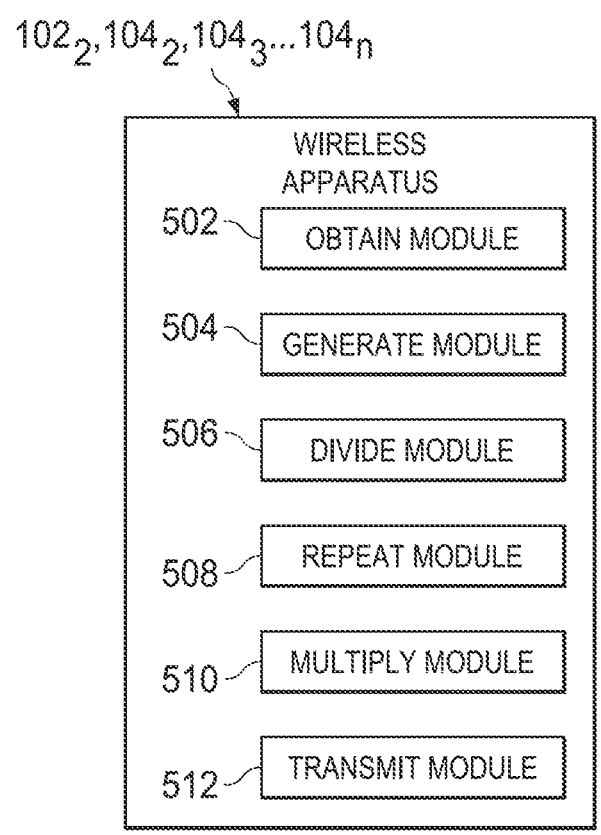
FIG. 5 is a block diagram illustrating structures of an exemplary wireless apparatus (wireless access node or wireless device) for transmitting a signal to another wireless apparatus (wireless device or wireless access node) in accordance with an embodiment of the present disclosure.

Referring to FIG. 5, there is a block diagram illustrating structures of an exemplary wireless apparatus $102_2$, $104_2$, $104_3$ ... $104_n$ configured for transmitting one or more signals $202_2$, $202_3$ ... $202_n$, 206 to one or more other wireless apparatuses $104_2$, $104_3$ ... $104_n$, $102_2$ in accordance with an embodiment of the present disclosure. In an embodiment, the wireless apparatus $102_2$, $104_2$, $104_3$ ... $104_n$ may comprise an obtain module 502, a generate module 504, a divide module 506, a repeat module 508, a multiply module 510, and a transmit module 512. The obtain module 502 may be configured to obtain code bits $136_1$, $136_2$, $136_3$ ... $136_y$ for another wireless apparatus $104_2$, $104_3$ ... $104_n$, $102_2$. The generate module 504 may be configured to generate the baseband signal 138 using the code bits $136_1$, $136_2$, $136_3$ ... $136_y$. The divide module 506 may be configured to divide the baseband signal 138, e.g., per a block format K, into a plurality of blocks $140_1$, $140_2$ ... $140_x$, where each block $140_1$, $140_2$ ... $140_x$ contains one or more time division units. The repeat module 508 may be configured to repeat N times each block $140_1$, $140_2$ ... $140_x$ to generate a plurality of sequences of N repeated blocks $142_1$, $142_2$ ... $142_x$. The multiply module 510 may be configured to multiply (e.g., phase shift) each of the plurality of sequences of the N repeated blocks $142_1$, $142_2$ ... $142_x$ by a code word of length N selected from a set of orthogonal code words (e.g., a row (or column) of a Hadamard matrix) to generate sequences of the multiplied N repeated blocks $144_1$, $144_2$ ... $144_x$. The transmit module 512 may be configured to transmit the plurality of sequences of the multiplied N repeated blocks $144_1$, $144_2$ ... $144_x$ in one of the signals $202_2$, $202_3$ ... $202_n$, 206 to the other wireless apparatus $104_2$, $104_3$ ... $104_n$, $102_2$.

As those skilled in the art will appreciate, the above-described modules 502, 504, 506, 508, 510 and 512 of the wireless apparatus $102_2$, $104_2$, $104_3$ ... $104_n$ may be implemented separately as suitable dedicated circuits. Further, the modules 502, 504, 506, 508, 510 and 512 can also be implemented using any number of dedicated circuits through functional combination or separation. In some embodiments, the modules 502, 504, 506, 508, 510 and 512 may be even combined in a single application specific integrated circuit (ASIC). As an alternative software-based implementation, the wireless apparatus $102_2$, $104_2$, $104_3$ ... $104_n$ may comprise a memory $120_1$, $120_2$, $120_3$ ... $120_n$, $134_1$ and $134_2$, a processor $118_1$, $118_2$, $118_3$ ... $118_n$, $132_1$ and $132_2$ (including but not limited to a microprocessor, a microcontroller or a Digital Signal Processor (DSP), etc.) and a transceiver $110_1$, $110_2$, $110_3$ ... $110_n$, $122_1$ and $122_2$. The memory $120_1$, $120_2$, $120_3$ ... $120_n$, $134_1$ and $134_2$ stores machine-readable program code executable by the processor $118_1$, $118_2$, $118_3$ ... $118_n$, $132_1$ and $132_2$ to cause the wireless apparatus $102_2$, $104_2$, $104_3$ ... $104_n$ to perform the above-described method 400.

Figure 6:
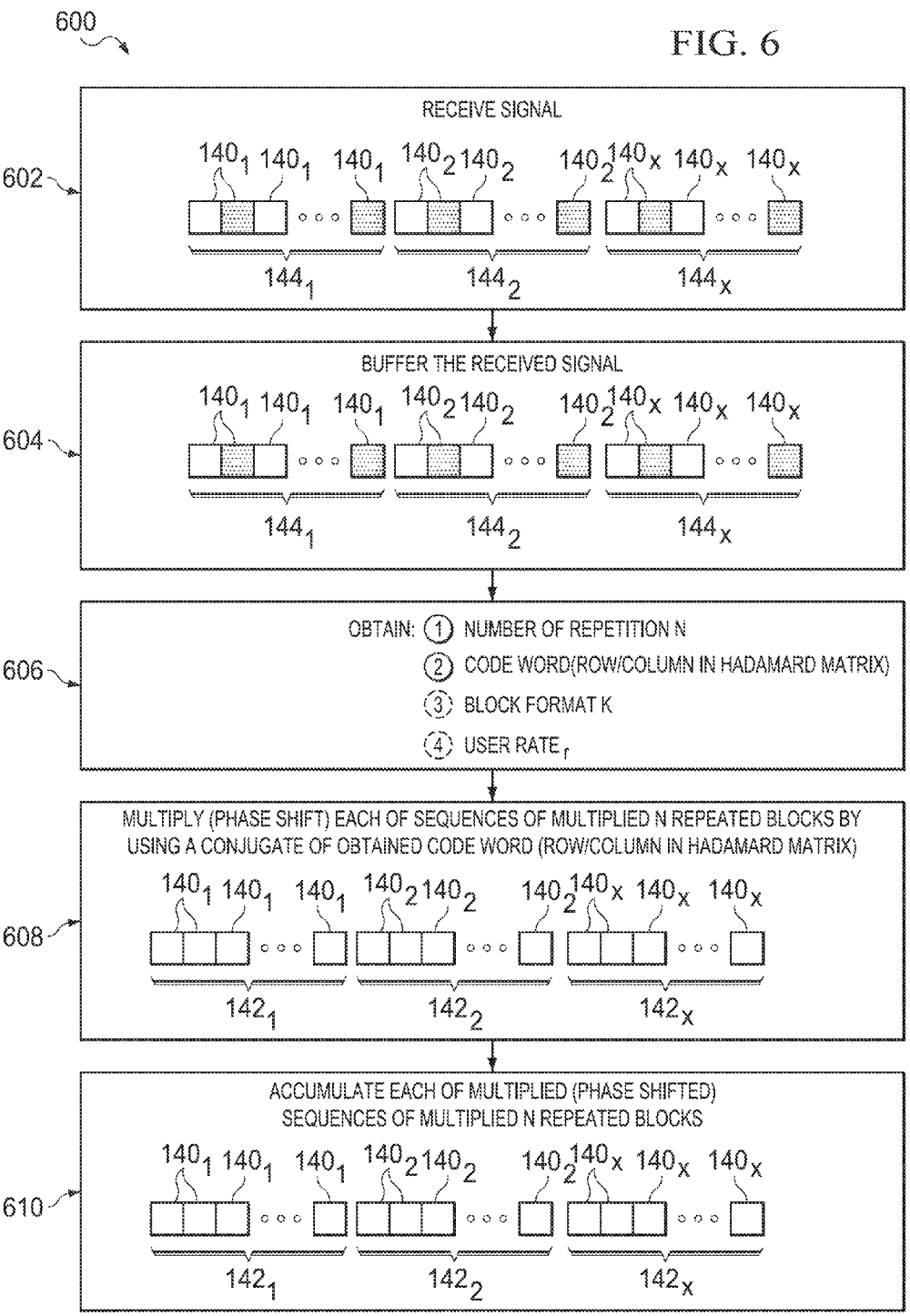
FIG. 6 is a flowchart of a method implemented in a wireless apparatus (wireless access node or wireless device) for receiving a signal from another wireless apparatus (wireless device or wireless access node) in accordance with an embodiment of the present disclosure.

Referring to FIG. 6, there is a flowchart of a method 600 in a wireless apparatus $102_2$, $104_2$, $104_3$ ... $104_n$ for receiving one or more signals $202_2$, $202_3$ ... $202_n$, 206 from one or more other wireless apparatuses $104_2$, $104_3$ ... $104_n$, $102_2$ in accordance with an embodiment of the present disclosure. At step 602, the wireless apparatus $102_2$, $104_2$, $104_3$ ... $104_n$ receives one of the signals $202_2$, $202_3$ ... $202_n$ or 206 from one of the other wireless apparatuses $104_2$, $104_3$ ... $104_n$, $102_2$. The received signal $202_2$, $202_3$ ... $202_n$ or 206 includes a plurality of sequences of multiplied N repeated blocks $144_1$, $144_2$ ... $144_x$ (see FIGS. 4's step 412). At step 604, the wireless apparatus $102_2$, $104_2$, $104_3$ ... $104_n$ buffers (stores in memory $120_1$, $120_2$, $120_3$ ... $120_n$, $134_1$, $134_2$) the received signal $202_2$, $202_3$ ... $202_n$ or 206. At step 606, the wireless apparatus $102_2$, $104_2$, $104_3$ ... $104_n$ obtains information indicating (1) a number of repetitions (N) of blocks in the received signal $202_2$, $202_3$ ... $202_n$ or 206, and (2) a code word of length N selected from a set of orthogonal code words (e.g., a row or column in a Hadamard matrix), for example, where the code word is unique to the one of the other wireless apparatuses $104_2$, $104_3$ ... $104_n$, $102_2$. The wireless apparatus $102_2$, $104_2$, $104_3$ ... $104_n$ may also obtain information indicating (3) a block format (K) of the blocks in the received signal $202_2$, $202_3$ ... $202_n$ or 206, and (4) a user rate r of the one of the other wireless apparatuses $104_2$, $104_3$ ... $104_n$, $102_2$. The block format (K) is the mapping from blocks to time division units in the TDMA slot structure. For example, in the case of GSM, the block format (K) describes how the blocks are mapped to time slots and TDMA frames. The wireless apparatus $102_2$, $104_2$, $104_3$ ... $104_n$ may obtain this information in any one of a variety of ways including, for example, at call setup via dedicated signaling or common control signaling (e.g., access grant channel). At step 608, the wireless apparatus $102_2$, $104_2$, $104_3$ ... $104_n$ multiplies each of the plurality of sequences of the multiplied N repeated blocks $144_1$, $144_2$ ... $144_x$ by a conjugate (e.g., complex conjugate) of the obtained code word of length N selected from the set of orthogonal code words to generate a plurality of multiplied sequences of the multiplied N repeated blocks $142_1$, $142_2$ ... $142_x$ (see FIGS. 4's step 408). In one example, the wireless apparatus $102_2$, $104_2$, $104_3$ ... $104_n$ performs step 608 by using a conjugate of the previously obtained row or column in the Hadamard matrix and the previously obtained user rate r to apply a constant phase shift to each block in the sequences of the multiplied N repeated blocks $144_1$, $144_2 \ldots 144_x$ to generate a plurality of multiplied sequences of the multiplied N repeated blocks $142_1, 142_2 \ldots 142_x$. It should be appreciated that the user rate r can be used in the case of multi-rate, since in this case not all entries of the Hadamard matrix are used (see discussion below) and by knowing the user rate r, it is possible to determine the code word entries that are used. In one case, the wireless apparatus $102_2, 104_2, 104_3 \ldots 104_n$ can perform step 608 using a serial-to-parallel processing scheme where all the repeated blocks $140_1, 140_2 \ldots 140_x$ in one sequence of the multiplied N repeated blocks $144_1$ (for example) are phase shifted (multiplied) at the same time by using a conjugate of the previously specified row or column in the Hadamard matrix. The same phase shifting (multiplying) process would occur for each set of repeated blocks $140_1, 140_2 \ldots 140_x$ in each of the sequences of the multiplied N repeated blocks $144_1, 144_2 \ldots 144_x$. At step 610, the wireless apparatus $102_2, 104_2, 104_3 \ldots 104_n$ accumulates each of the plurality of multiplied (phase shifted) sequences of the multiplied N repeated blocks $142_1, 142_2 \ldots 142_x$, for example, to obtain the blocks $140_1, 140_2 \ldots 140_x$ of the baseband signal 138 after propagation through the physical channel 204 or 208.

In the UL case illustrated in FIG. 2, the wireless apparatus implementing the method 600 would be the wireless access node $102_2$ (e.g., base station $102_2$) and the other wireless apparatus which transmitted the sequences of the multiplied N repeated blocks $144_1, 144_2 \ldots 144_x$ associated with one of the signals $202_2, 202_3 \ldots 202_n$ would be one of the wireless devices $104_2, 104_3 \ldots 104_n$. In one example, the wireless access node $102_2$ can communicate over the same physical channel 204 with multiple wireless devices $104_2, 104_3 \ldots 104_n$ by performing the receive step 602, the buffer step 604, the obtain step 606, the multiply step 608, and the accumulate step 610 for each of the wireless devices $104_2, 104_3 \ldots 104_n$. In this situation, the wireless access node $102_2$ is operable to perform each of the multiply steps 608 where each of the wireless devices $104_2, 104_3 \ldots 104_n$ was assigned its own unique code word of length N selected from the set of orthogonal code words (or its own row or column in the Hadamard matrix).

In the DL case illustrated in FIG. 3, the wireless apparatus implementing the method 600 would be one of the wireless devices $104_2, 104_3 \ldots 104_n$ and the other wireless apparatus which transmitted the sequences of the multiplied N repeated blocks $144_1, 144_2 \ldots 144_k$ associated with the signal 206 would be the wireless access node $102_2$ (e.g., base station $102_2$). In another example, the wireless access node $102_2$ is operable to communicate over the same physical channel 208 with multiple wireless devices $104_2, 104_3 \ldots 104_n$ by transmitting one multiplexed signal 206 to each of the wireless devices $104_2, 104_3 \ldots 104_n$. Then, each of the wireless devices $104_2, 104_3 \ldots 104_n$ upon receiving the multiplexed signal 206 would implement method 600. It should be noted that due to the orthogonality of the code words, the individual signals present in the multiplexed signal 206 sent on the same physical resource/channel 208 but using other orthogonal code words will be cancelled while the desired signal for each wireless device $104_2, 104_3 \ldots 104_n$ will be coherently accumulated therein. In this way, up to X wireless devices $104_2, 104_3 \ldots 104_n$ (where X=number of code words in the orthogonal matrix) can be multiplexed onto the same physical channel, which will fully compensate for the capacity loss due to the repetition. At the same time, the coverage gain of coherent reception is retained.

Figure 7:
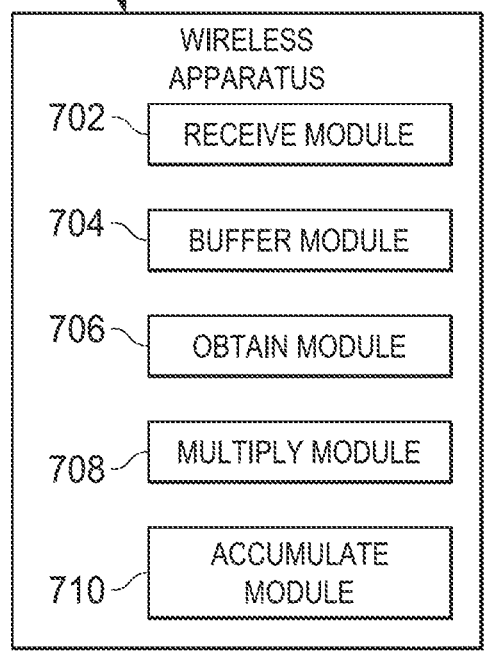
FIG. 7 is a block diagram illustrating structures of an exemplary wireless apparatus (wireless access node or wireless device) for receiving a signal from another wireless apparatus (wireless device or wireless access node) in accordance with an embodiment of the present disclosure.

Referring to FIG. 7, there is a block diagram illustrating structures of an exemplary wireless apparatus $102_2, 104_2, 104_3 \ldots 104_n$ configured for receiving one or more signals $202_2, 202_3 \ldots 202_n,$ 206 from one or more other wireless apparatuses $104_2, 104_3 \ldots 104_n, 102_2$ in accordance with an embodiment of the present disclosure. In an embodiment, the wireless apparatus $102_2, 104_2, 104_3 \ldots 104_n$ may comprise a receive module 702, a buffer module 704, an obtain module 706, a multiply module 708, and an accumulate module 710. The receive module 702 is configured to receive one of the signals $202_2, 202_3 \ldots 202_n$ or 206 which includes a plurality of sequences of multiplied N repeated blocks $144_1, 144_2 \ldots 144_x$ from one of the other wireless apparatuses $104_2, 104_3 \ldots 104_n, 102_2$. The buffer module 704 is configured to buffer (store) the received signal $202_2, 202_3 \ldots 202_n$ or 206. The obtain module 706 is configured to obtain information indicating (1) a number of repetitions (N) of blocks in the received signal $202_2, 202_3 \ldots 202_n$ or 206, and (2) a code word of length N selected from a set of orthogonal code words (e.g., a row or column in a Hadamard matrix), for example, where the code word is unique to the one of the other wireless apparatuses $104_2, 104_3 \ldots 104_n, 102_2$. Further, the obtain module 706 may also obtain information indicating (3) a block format (K) of the blocks in the received signal $202_2, 202_3 \ldots 202_n$ or 206, and (4) a user rate r of the one of the other wireless apparatuses $104_2, 104_3 \ldots 104_n, 102_2$. The multiply module 708 may be configured to multiply each of the plurality of sequences of the multiplied N repeated blocks $144_1, 144_2 \ldots 144_x$ by a conjugate (e.g., complex conjugate) of the obtained code word of length N selected from the set of orthogonal code words to generate a plurality of multiplied sequences of the multiplied N repeated blocks $142_1, 142_2 \ldots 142_x$. In one example, the multiply module 708 may be configured to use the previously obtained row or column in the Hadamard matrix and the previously obtained user rate r to apply a constant phase shift to each block in the sequences of the multiplied N repeated blocks $144_1, 144_2 \ldots 144_x$ to generate a plurality of multiplied sequences of the multiplied N repeated blocks $142_1, 142_2 \ldots 142_x$. The accumulate module 710 may be configured to accumulate each of the plurality of multiplied (phase shifted) sequences of the multiplied N repeated blocks $142_1, 142_2 \ldots 142_x$ to obtain blocks $140_1, 140_2 \ldots 140_x$ of the baseband signal 138 after propagation through the physical channel 204 or 208.

As those skilled in the art will appreciate, the above-described modules 702, 704, 706, 708, and 710 of the wireless apparatus $102_2, 104_2, 104_3 \ldots 104_n$ may be implemented separately as suitable dedicated circuits. Further, the modules 702, 704, 706, 708, and 710 can also be implemented using any number of dedicated circuits through functional combination or separation. In some embodiments, the modules 702, 704, 706, 708, and 710 may be even combined in a single application specific integrated circuit (ASIC). As an alternative software-based implementation, the wireless apparatus $102_2, 104_2, 104_3 \ldots 104_n$ may comprise a memory $120_1, 120_2, 120_3 \ldots 120_n, 134_1$ and $134_2$, a processor $118_1, 118_2, 118_3 \ldots 118_n, 132_1$ and $132_2$ (including but not limited to a microprocessor, a microcontroller or a Digital Signal Processor (DSP), etc.) and a transceiver $110_1, 110_2, 110_3 \ldots 110_n, 122_1$ and $122_2$. The memory $120_1, 120_2, 120_3 \ldots 120_n, 134_1$ and $134_2$ stores machine-readable program code executable by the processor $118_1, 118_2, 118_3 \ldots 118_n, 132_1$ and $132_2$ to cause the wireless apparatus $102_2, 104_2, 104_3 \ldots 104_n$ to perform the above-described method 600.

Concept Description

The air interface in the GSM/EGPRS wireless communication network 100 and others based on WCDMA, LTE etc. . . . rely on TDMA in order to divide and allocate time among the users (e.g., wireless devices $104_1$, $104_2$, $104_3$ . . . $104_n$). In addition to TDMA, other multiplexing techniques are employed. For example, GSM also employs Frequency Division Multiple Access (FDMA), LTE also employs Orthogonal Frequency Division Multiple Access (OFDMA), while WCDMA also employs Code Division Multiple Access (CDMA). The TDMA structure provides a frame structure in time, which is used to assign radio resources to the user (e.g., wireless devices $104_1$, $104_2$, $104_3$ . . . $104_n$). The time resources are divided into basic units, which are grouped into larger units, and these larger units may in turn be grouped into even larger units, and so on. For example, in GSM the basic division of time is called a time slot (TS), and eight consecutive TSs are grouped into one TDMA frame. In LTE, there are also TSs, where two TSs are grouped into one sub-frame, and ten sub-frames constitute one TDMA frame. The disclosed techniques can be applied to existing cellular systems, as long as their air interface possesses a TDMA structure and the phase reference in repeated transmissions can be controlled.

For the purposes of the disclosed techniques, the basic units of time are grouped into blocks $140_1$, $140_2$ . . . $140_x$, each block containing one or more basic time division units (see FIG. 4's step 406). The blocks $140_1$, $140_2$ . . . $140_x$ used in the disclosed techniques may or may not correspond to predefined time division units standardized in the air interface. For example, in one embodiment, one block $140_1$ may correspond to one GSM TS, which is a predefined time division unit in GSM. However, in another embodiment, one block $140_1$ may correspond to two consecutive TSs in GSM. In this case, the one block $140_1$ does not correspond to a predefined time division unit in GSM. Further examples are provided. In GSM, one block $140_1$ could be one TDMA frame (comprising 8 consecutive TSs), and in LTE, one block $140_1$ could be one sub-frame (comprising two LTE TSs) or one frame (comprising 10 LTE sub-frames). Many other examples of blocks $140_1$, $140_2$ . . . $140_x$ may be used in the disclosed techniques and useful in practice.

The same block $140_1$, $140_2$ . . . $140_x$ is transmitted several times, applying a constant phase and possibly an amplitude shift to each of the blocks $140_1$, $140_2$ . . . $140_x$ (see FIG. 4's steps 410 and 412). In the remainder of the disclosed techniques, only phase shift is considered, but the description would equally apply for a combination of phase shift and possibly variations in amplitude.

The phase shift may vary from block $140_1$ to block $140_2$. In other words, the whole signal corresponding to one block is phase shifted by a certain phase shift. The number of block repetitions and possible phase shifts applied to the signal $202_2$, $202_3$ . . . $202_n$ and 206 is known at both the transmitter $114_1$, $114_2$, $114_3$ . . . $114_n$, $128_1$ and $128_2$ and the receiver $116_1$, $116_2$, $116_3$ . . . $116_n$, $130_1$ and $130_2$. Each block $140_1$, $140_2$ . . . $140_x$ repetition is phase shifted by a constant phase shift, where the phase shift corresponds to an entry in a row (or column) of an orthogonal matrix. The number of the row (or column) is specific to the user (e.g., wireless devices $104_1$, $104_2$, $104_3$ . . . $104_n$). For example, the orthogonal matrix could be a Hadamard matrix which is described in detail below. The total number of repetitions of each block $140_1$, $140_2$ . . . $140_x$ is equal to the number of columns (or rows) in the Hadamard matrix. In one example, if a given user (e.g., wireless device $104_3$) is assigned the third row, then the block repetitions will be phase shifted by 0 degrees or 180 degrees depending on whether the third row entry is 1 or −1. In the case where all the users (e.g., wireless devices $104_1$, $104_2$, $104_3$ . . . $104_n$) have the same rate, each block $140_1$, $140_2$ . . . $140_x$ is phase shifted by a different entry in the matrix row assigned to the user (e.g., wireless device $104_1$, $104_2$, $104_3$ . . . $104_n$). The situation is slightly more complex when the users (e.g., wireless devices $104_1$, $104_2$, $104_3$ . . . $104_n$) are allowed to have several rates. This multi-rate situation is described in more detail below.

Furthermore, the circuitry of the transmitter $114_1$, $114_2$, $114_3$ . . . $114_n$, $128_1$ and $128_2$ and the receiver $116_1$, $116_2$, $116_3$ . . . $116_n$, $130_1$ and $130_2$ should generally not introduce any additional phase shifts. For example, the GSM standard allows the transmitter $114_1$, $114_2$, $114_3$ . . . $114_n$, $128_1$ and $128_2$ to apply random phase shifts in each TS. Such phase shifts should generally not be used with the disclosed techniques.

At the receiver $116_1$, $116_2$, $116_3$ . . . $116_n$, $130_1$ and $130_2$, the received blocks $144_1$, $144_2$ . . . $144_x$ are buffered (see FIG. 6's step 604). The row (or column) of the orthogonal matrix used by each user (e.g., wireless devices $104_1$, $104_2$, $104_3$ . . . $104_n$) is known at the receiver $116_1$, $116_2$, $116_3$ . . . $116_n$, $130_1$ and $130_2$. For example, if user X used the third row of a Hadamard matrix to phase shift the block repetitions $142_1$, $142_2$ . . . $142_x$, then the receiver $130_2$ (for example) needs to know that user X used the third row of the Hadamard matrix in order to correctly decode the information of that user X (see FIG. 6's steps 606 and 608). A phase shift equal to the negative of the phase shift used at the transmitter $114_2$ (for example) of user X is applied to each received block $144_1$, $144_2$ . . . $144_x$ (see FIG. 6's step 608). After all the block $144_1$, $144_2$ . . . $144_x$ repetitions have been received, the blocks are accumulated/combined by addition of the received in-phase and quadrature (I, Q) samples (see FIG. 6's step 610). In other words, after the phase shift, the raw received digital samples from each phase shifted block $142_1$, $142_2$ . . . $142_x$ are accumulated/added. Further, it should be appreciated that it is not necessary to perform channel estimation in order to combine the blocks $142_1$, $142_2$ . . . $142_x$. The disclosed technique is useful if the Signal-to Noise Ratio (SNR) is extremely low, as it may be in some MTC applications. After the block addition, the sum signal is equivalent (except for the increased SNR) to a signal that would be received if the CDMA overlay was not present and may be processed by a conventional receiver.

Transmission Schemes

In this section, the application of the CDMA overlay technique to different transmission schemes is described. It should be noted that the application of the disclosed techniques is not limited to these discussed transmission schemes, as the schemes are merely listed herein as examples.

Single Input Multiple Output (SIMO): Although users (e.g., wireless devices $104_2$, $104_3$ . . . $104_n$) are multiplexed on the same physical resources, simultaneously transmitting, full orthogonality can still be achieved by using a single transmitter (e.g., transmitter $128_2$) for transmitting the multiple block sequences $144_1$, $144_2$ . . . $144_x$ to a multiplicity of users (e.g., wireless devices $104_2$, $104_3$ . . . $104_n$). The use of a single transmitter (e.g., transmitter $128_2$) will imply sharing of the power but will also allow the multiple block sequences $144_1$, $144_2$ . . . $144_x$ to have different amplitudes to achieve different power imbalance ratios between the orthogonal sequences. A typical example where this transmission scheme would be used is in the DL direction of a cellular network with one base station $102_2$ communicating with multiple mobiles $104_2$, $104_3$ . . . $104_n$ using the same physical resource 208. This transmission scheme is illustrated in FIG. 3.

Multiple Input Single Output (MISO): Orthogonality between the block sequences is also achieved with the disclosed techniques for the case of multiple transmitters $114_2, 114_3 \ldots 114_n$ (for example) experiencing the same or different channel propagation, all received by a single receiver entity $102_2$ (for example). A typical example where this transmission scheme would be used is in the UL direction of a cellular network where multiple mobile devices $104_2, 104_3 \ldots 104_n$ communicate with a single base station $102_2$ using the same physical resource 204. This transmission scheme is illustrated in FIG. 2.

Channel Access Type

In one embodiment of the disclosed techniques, a central node (e.g., wireless access node $102_2$, base station $102_2$) is in control of the orthogonal code used in each block sequence $142_1, 142_2 \ldots 142_x$, ensuring that all code words in use are orthogonal to all other possible code words used on the same physical resource. For example, multiple mobile devices $104_2, 104_3 \ldots 104_n$ assigned the same physical resources 204 on the UL are each assigned a different code word by the central node (e.g., wireless access node $102_2$, base station $102_2$). Each assigned code word is ensured by the central node (e.g., wireless access node $102_2$, base station $102_2$) to be orthogonal to all other assigned code words.

In another embodiment of the disclosed techniques, the orthogonal codes are not assigned by a central node (e.g., wireless access node $102_2$, base station $102_2$). Instead, the code word of each block sequence $142_1, 142_2 \ldots 142_x$ is derived independently of the code words of other possible block sequences $142_1, 142_2 \ldots 142_x$ used on the same physical resource 204. For a specific block sequence $142_1, 142_2 \ldots 142_x$, the same code word needs to be used throughout the full block sequence, but code words could be varied over time in-between block sequences. An example of this technique is on collision based channels, such as the random access channel (RACH) in GSM, where an arbitrary number of mobile devices $104_2, 104_3 \ldots 104_n$ can simultaneously try to access the wireless communication network 100. It is generally not known which mobile device $104_2, 104_3 \ldots 104_n$ will attempt to access the wireless communication network 100 and hence, it is not possible to ensure that all mobile devices $104_2, 104_3 \ldots 104_n$ use different, orthogonal code words at the time of access.

However, the disclosed techniques provide successful multiplexing for such a channel 204 when each available code word is used at most once by the multiple wireless devices $104_2, 104_3 \ldots 104_n$ simultaneously attempting to access the wireless communication network 100. As the code words generally are orthogonal assuming the block sequences are completely overlapping in time, a fixed frame structure where access attempts are allowed maximizes the orthogonality of the random accesses. For example, access attempts that require an N block repetition need to start at a TDMA frame number (FN) such that FN modulo N equals zero (i.e., mod(FN,N)=0). The orthogonal code word (out of N possible code words) to use could, for example, be determined by a user-specific value, such as the International Mobile Subscriber Identity (IMSI) of the mobile device $104_2, 104_3 \ldots 104_n$ (e.g., mod(IMSI,N)). Further, the code word for a user (e.g., wireless device $104_2, 104_3 \ldots 104_n$) may instead be determined using other techniques.

Multi-Rate Extension

Multi-rate multiplexing means that users (e.g., wireless devices $104_2, 104_3 \ldots 104_n$) of different rates are multiplexed. In other words, the number of block repetitions may be unequal and user-specific. For instance, during the same time interval, some users (e.g., wireless devices $104_2$ and $104_3$) may transmit one block of data repeated eight times, while other users (e.g., wireless devices $104_4$ and $104_5$) transmit two blocks that are each repeated four times, and still other users (e.g., wireless devices $104_6$ and $104_7$) transmit four blocks that are each repeated two times.

This can be achieved without losing orthogonality by utilizing the fact that sub-matrices of the orthogonal code matrix may also constitute orthogonal codes. For instance, consider the Hadamard matrix $H_3$ discussed below. If the user (e.g., wireless device $104_2$) using row 1 of the matrix $H_3$ transmits a block of data repeated four times followed by another block of data repeated four times (each transmitted block phase shifted according to row 1 of the matrix), while all other users (e.g., wireless devices $104_3, 104_4 \ldots 104_n$) repeat their respective block eight times, the signal corresponding to the first four columns will be orthogonal to the first four blocks of all signals except that corresponding to row 5 of the Hadamard matrix $H_3$. Likewise, the signal corresponding to the last four columns will be orthogonal to the last four blocks of all signals except that corresponding to row 5 of the Hadamard matrix $H_3$. Therefore, if the signal corresponding to row 5 of the matrix $H_3$ is not transmitted (i.e., no user is assigned row 5), orthogonality is maintained. In effect, two users of rate 1/8 are replaced by one user of rate 1/4, which does not impact the capacity. This concept of multiplexing users (e.g., wireless devices $104_2, 104_3 \ldots 104_n$) with different numbers of repetition N, and therefore a different data rate, is possible, for example, by applying the multi-rate technique described in co-assigned U.S. Publication No. 2013/0272273 A1, the contents of which are herein incorporated by reference. This multi-rate concept is applicable to the CDMA overlay techniques described in the present disclosure.

Application to GSM

Figure 8:
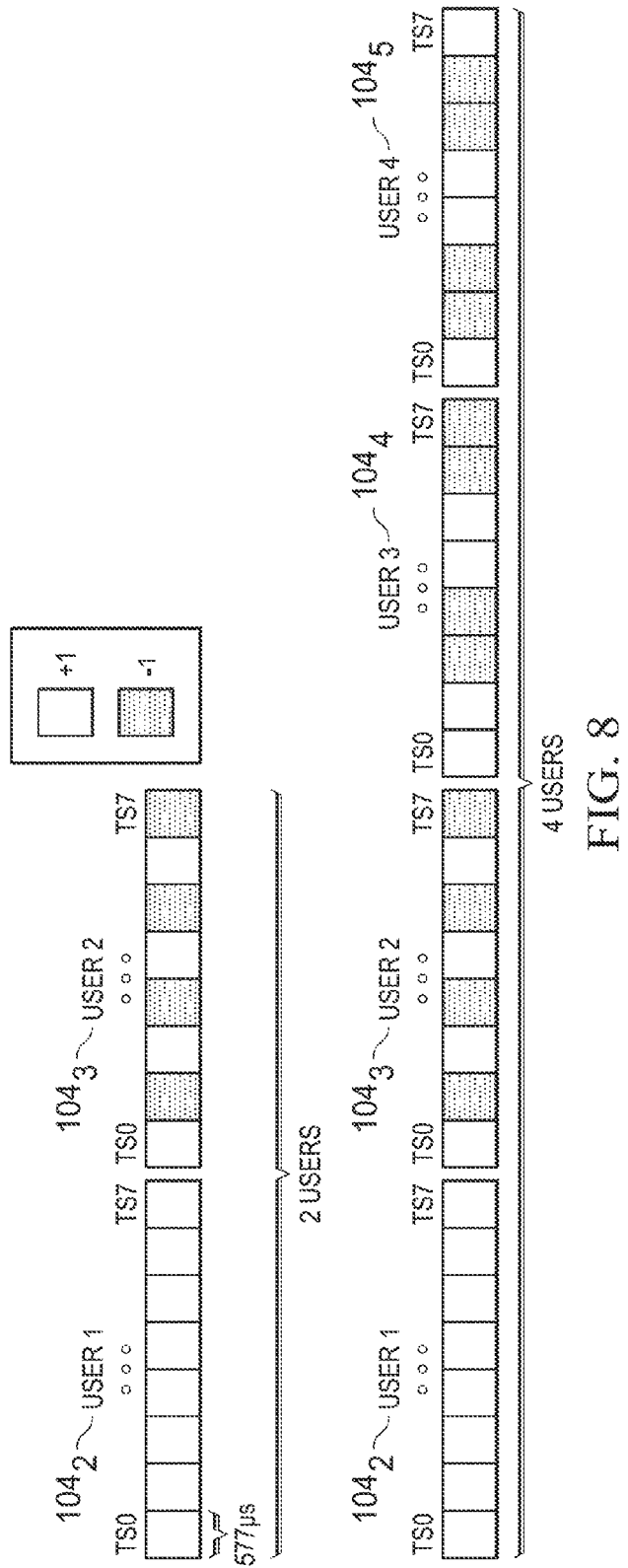
FIG. 8 is a diagram which illustrates two and four users (wireless devices) multiplexing across TSs within a TDMA frame in accordance with an embodiment of the present disclosure.

The CDMA overlay technique described herein has an example illustrated in FIG. 8 which illustrates two and four users (wireless devices $104_2, 104_3, 104_4$ and $104_5$) multiplexing across TSs within a TDMA frame. In this example, two and four users (wireless devices $104_2, 104_3, 104_4$ and $104_5$) are multiplexed during the eight TSs of a TDMA frame in GSM using the Hadamard transform (see the 8×8 Hadamard matrix $H_3$ discussed below) to achieve orthogonal block sequences. In this example, users 1, 2, 3 and 4 are respectively assigned codes from rows 1, 2, 3 and 4 of the 8×8 Hadamard matrix $H_3$. It should be noted that orthogonality is achieved after two TSs for the two-user case, and after four TSs for the four-user case.

Figure 9:
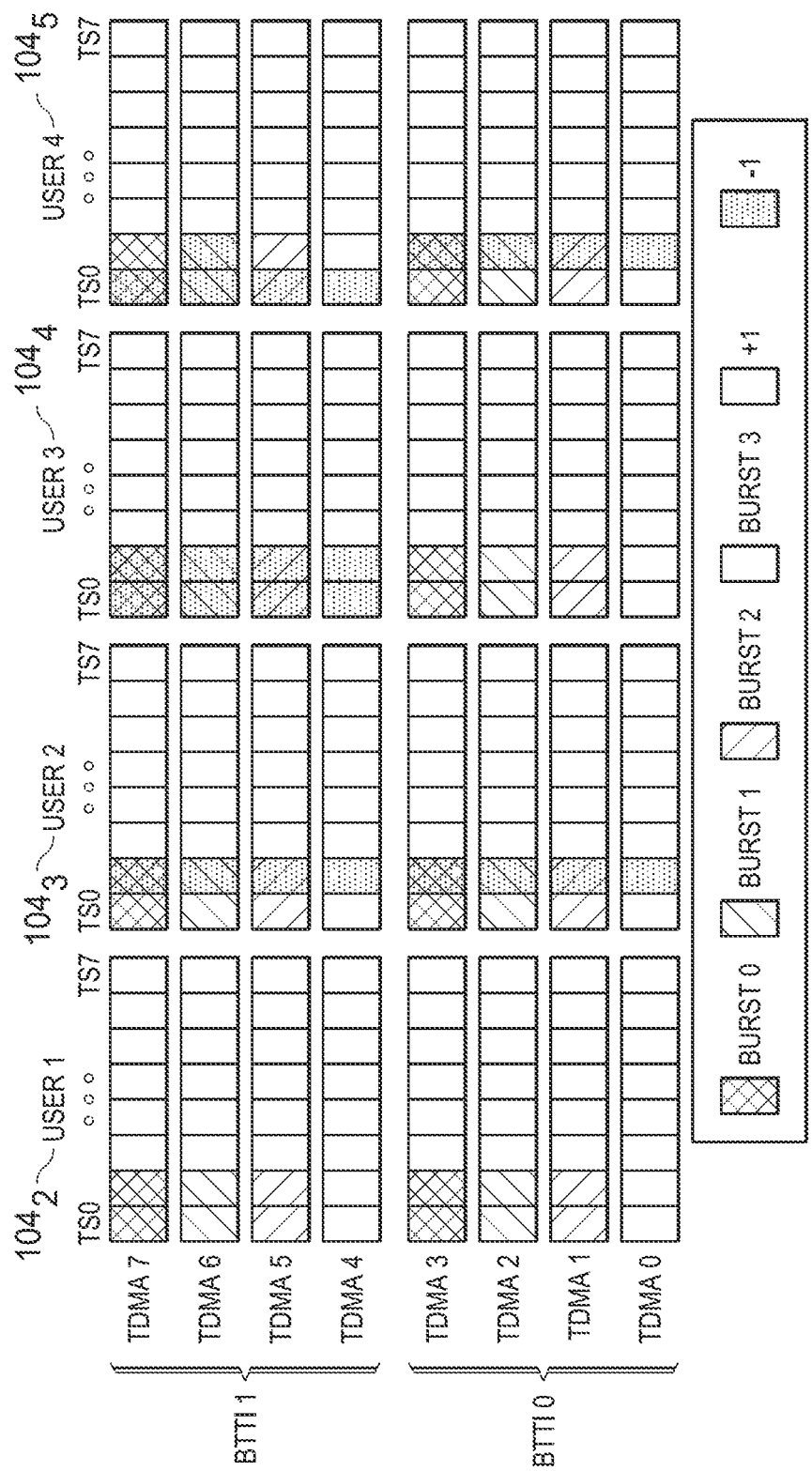
FIG. 9 is a diagram which illustrates four users (wireless devices) multiplexing across TSs and across TDMA frames in accordance with an embodiment of the present disclosure.

Another example is illustrated in FIG. 9 which illustrates four users (wireless devices $104_2, 104_3, 104_4$ and $104_5$) multiplexing across TSs and across TDMA frames. In this example, the block repetition applies over both multiple timeslots within a TDMA frame and across the TDMA frames in multiple Transmission Time Intervals (TTIs). The TTI in current GSM systems can either be 20 ms Basic TTI (BTTI) or 10 ms Reduced TTI (RTTI) mapped onto four or two consecutive TDMA frames, respectively. The information is transmitted in radio blocks constituting four separate bursts (burst 0, . . . , burst 3). Also in this example, the realization of orthogonal sub-channels is achieved by the use of the Hadamard transform (see Hadamard matrix $H_3$ discussed below).

In FIG. 8, the multiplexing of users (wireless devices $104_2, 104_3, 104_4$ and $104_5$) is applied to transmissions of radio blocks within a TDMA frame in GSM. That is, the Hadamard transform is applied in the TS domain (to the eight TSs of each TDMA frame where one block is equal to one TS). The Hadamard transform could also be extended to the TTI domain as described above.

In FIG. 9, the orthogonal sub-channels not only span the TSs within a TDMA frame but also across the TTIs where repeated radio blocks are transmitted. In the illustrated example, only TS0 and TS1 in each TDMA frame are used with radio blocks repeated over two BTTIs. The principle may be applied to other numbers of TSs and numbers of TTIs. Compared to FIG. 8 where the Hadamard transform was mapped to TS0-TS7, the Hadamard transform in FIG. 9 is applied to the N=4 transmissions of the block sequence as illustrated in the following TABLE #1:

TABLE #1

TS0, TDMA 3, BTTI 0
TS1, TDMA 3, BTTI 0
TS0, TDMA 7, BTTI 1
TS1, TDMA 7, BTTI 1
for burst 0.
TS0, TDMA 2, BTTI 0
TS1, TDMA 2, BTTI 0
TS0, TDMA 6, BTTI 1
TS1, TDMA 6, BTTI 1
for burst 1, etc.

It should be noted that the exact mapping of the Hadamard transform onto the transmission opportunities for each sub-channel can be done in an arbitrary way as long as all sub-channels are using the same mapping procedure. The mappings described above are merely provided as examples.

Figure 10:
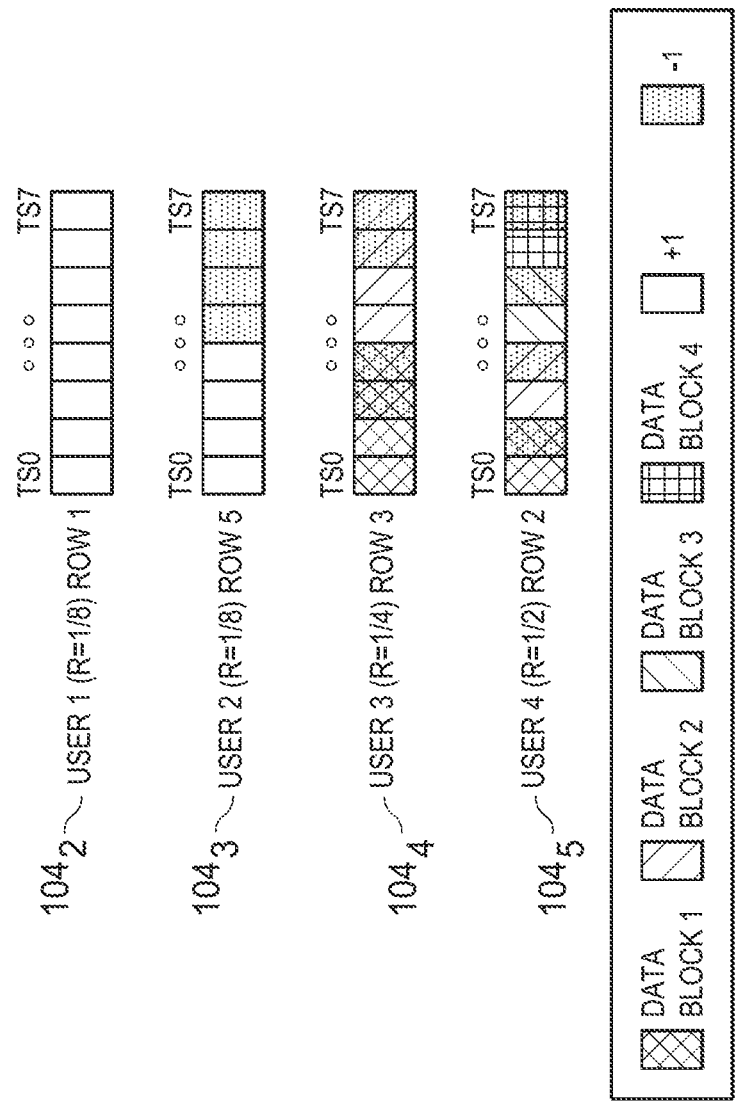
FIG. 10 is a diagram which illustrates a GSM application for multi-rate multiplexing using the CDMA overlay technique in accordance with an embodiment of the present disclosure.

Yet another example is illustrated in FIG. 10 which illustrates a GSM application for multi-rate multiplexing using the CDMA overlay technique. In this example, the multiplexing of four users 1, 2, 3, and 4 (wireless devices $104_2$, $104_3$, $104_4$ and $104_5$) is applied to transmissions of radio blocks within a TDMA frame in GSM, as in FIG. 8. An 8×8 Hadamard matrix $H_3$ is used. Each user is discussed next.

User 1 is a rate 1/8 user that transmits one block of data repeated eight times and multiplied by row 1 of Hadamard matrix $H_3$.

User 2 is also a rate 1/8 user that uses row 5 of Hadamard matrix $H_3$.

The SNR gain for these rate 1/8 users, with N=8, is $10*\log_{10}(8) \approx 9$ dB.

User 3 is a rate 1/4 user that first transmits one block of data repeated four times, and then transmits another block of data repeated four times. The total sequence of eight blocks is phase shifted according to row 3 of Hadamard matrix $H_3$ prior to transmission. The SNR gain for this rate 1/4 user, with N=4, is $10*\log_{10}(4) \approx 6$ dB.

User 4 is a rate 1/2 user that transmits two repetitions of a first block of data, then transmits two repetitions of a second block of data, then transmits two repetitions of a third block of data, and then transmits two repetitions of a fourth block of data. The total sequence of eight blocks is phase shifted according to row 2 of Hadamard matrix $H_3$ prior to transmission. The SNR gain for this rate 1/2 user, with N=2, is $10*\log_{10}(2) \approx 3$ dB.

Figure 11:
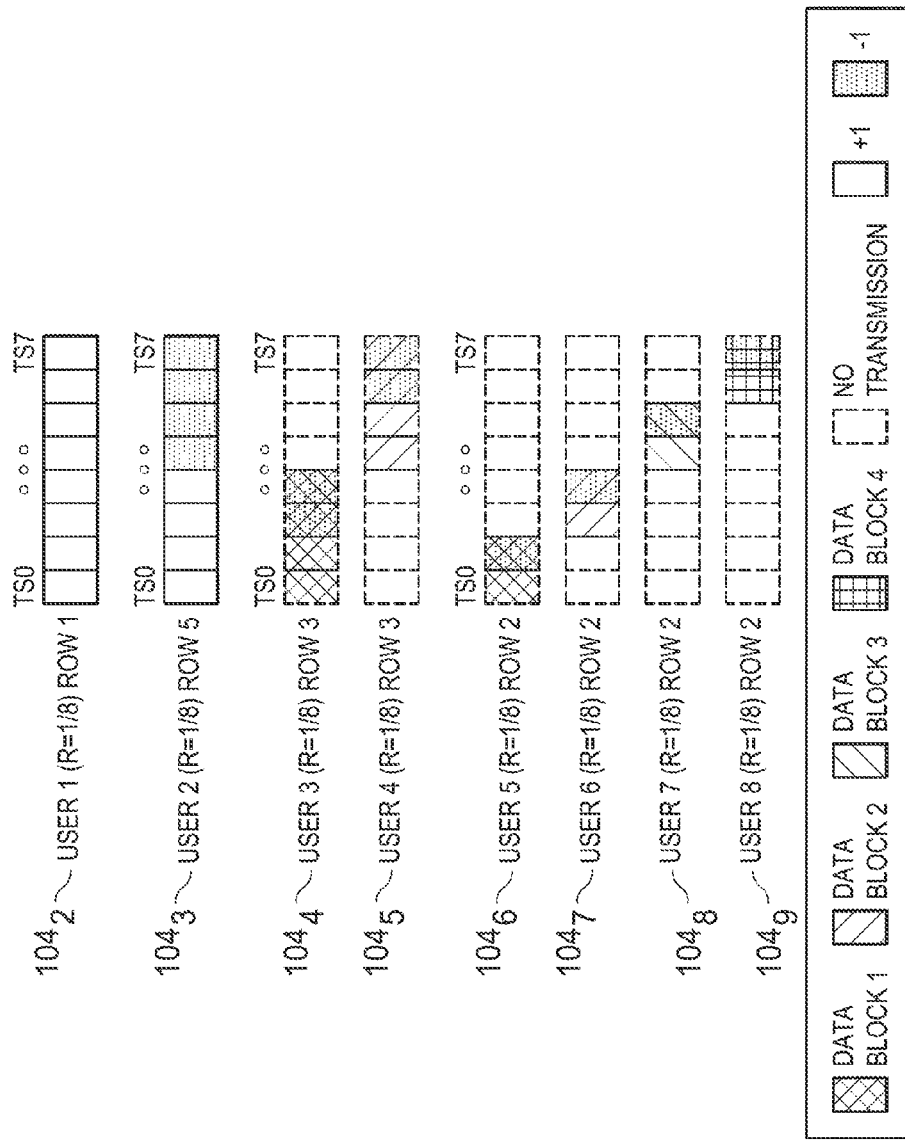
FIG. 11 is a diagram which illustrates another GSM application for multi-rate multiplexing using the CDMA overlay technique in accordance with an embodiment of the present disclosure.

It should be noted that the multi-rate extension principle can be used also for a different purpose, for example, as illustrated in FIG. 11. In this example, each user 1, 2 . . . 8 (wireless devices $104_2$, $104_3$ . . . $104_9$) transmits only one data block during the TDMA frame and therefore, all the users 1, 2 . . . 8 have the same data rate. However, some users now share the same row in the code matrix. Their transmissions are suppressed during part of the TDMA frame so that the users sharing the same row do not transmit simultaneously. For instance, users 3 and 4 share row 3 of the code Hadamard matrix $H_3$. User 3 uses the first four bursts of the TDMA frame, while user 4 uses the last four bursts of the TDMA frame. Similarly, users 5, 6, 7, and 8 share row 2 of the code Hadamard matrix $H_3$ but transmit during different bursts of the TDMA frame. The advantage compared to the example in FIG. 8 (in which four rate 1/8 users are also multiplexed during the TDMA frame) is that users in the current example do not need the full 9 dB SNR gain, achieved through N=8 repetition, because they can share a row in the code matrix and thereby reduce power consumption. In addition, if the channel is not fully stationary and hence orthogonality is partly lost, this will reduce the interference experienced by the other users.

Performance Simulations for GSM Application

To understand how the performance of each user (e.g., wireless device 104) is impacted by the use of the CDMA overlay technique, physical link level simulations have been carried out. In the simulations, each user is assumed to experience a fast fading propagation according to a typical urban channel (e.g., as described in the Typical case for urban area (TUx) in 3GPP TS 45.005 v12.0.0 Annex C, Section 3.3), using no frequency hopping, with the user assumed to be moving at a speed of 1.2 km/h resulting in a Doppler spread of 1 Hz in the 900 MHz band.

Figure 12:
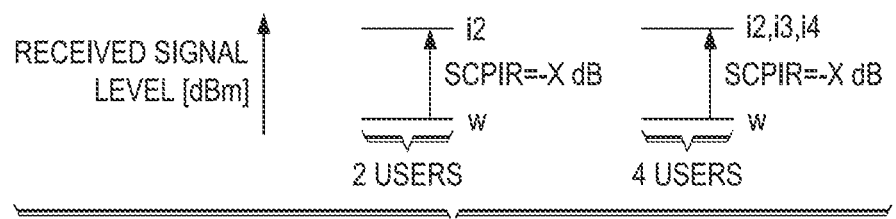
FIG. 12 is a diagram which illustrates a sub-channel power balance associated with simulations related to different embodiments of the present disclosure.

To challenge the disclosed techniques, a Sub-Channel Power Imbalance Ratio (SCPIR) was introduced that places the wanted user at a lower received power level than the other received user(s). The wanted user is used herein to refer to the user demodulated by the simulator, while in general terms, all users are wanted by the receiver. All users multiplexed with the wanted user are placed at the same SCPIR. FIG. 12 illustrates how SCPIR is used in the simulations performed, where 'w' indicates the received signal level of the wanted user, and 'ix' indicates the signal level of interfering user x. This diagram implies that when the number of users is increased, both the orthogonality between the sub-channels will be more challenged due to a non-stationary channel and impairments in the transceiver (transmitter, receiver) but also illustrates that the accumulated energy of the multiplexed users is increased. For example, if SCPIR is −3 dB, the total power of the paired user in the 2-user case is twice that of the wanted user. Using the same SCPIR but instead multiplexing eight users will result in a total power of the paired users to be, in effect, $(10*\log 10(2*7)) \approx 11.5$ dB higher than that of the wanted user.

Figure 13:
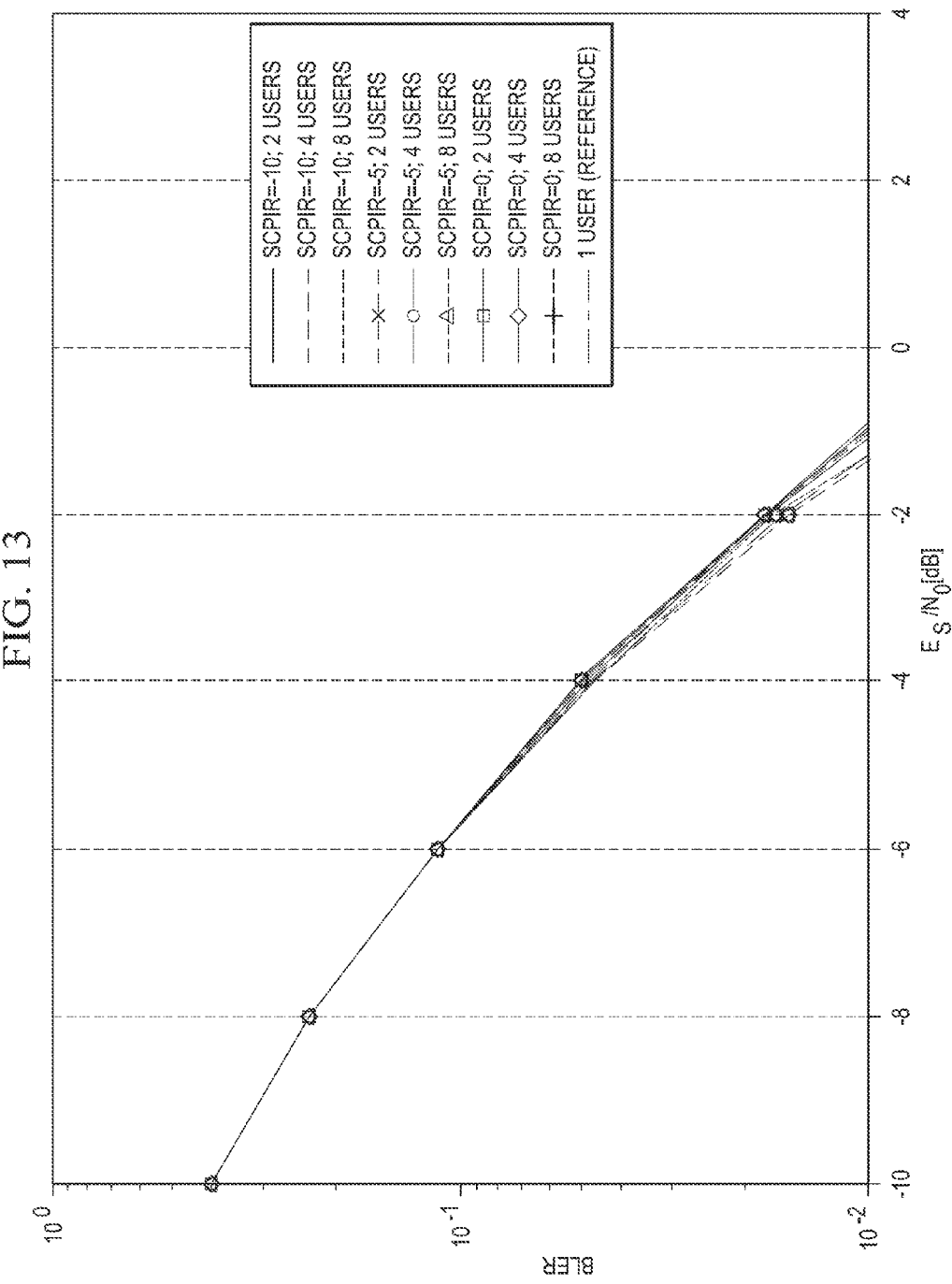
FIG. 13 is a simulation graph illustrating user performance at a Typical case for urban area (TUx) channel for a different number of users (speed=1.2 km/h) and different power imbalances in accordance with an embodiment of the present disclosure.

Referring to FIG. 13, there is a simulation graph 1300 illustrating user performance at the TUx channel for a different number of users (speed=1.2 km/h) and different power imbalances. The graph 1300 indicates that there is effectively no impact on performance when multiplexing users per the disclosed techniques when compared to the single user case (i.e., the reference case).

Referring to FIG. 14, there is a simulation graph 1400 illustrating user performance at the TUx channel for a different number of users (speed=30 km/h) and different power imbalances. To stress the system and understand the resulting performance when multiplexing users of higher speed, simulations were carried out with users moving at 30 km/h. Also, more extreme values of SCPIR were included between the users (sub-channels) in these simulations. In these simulations, increasing the user speed means the assumption on a stationary channel between the transmissions is no longer kept. Also, with a higher SCPIR, the loss of orthogonality due to a non-stationary channel becomes more evident. Still, the graph 1400 illustrates that there is minimal performance loss in multiplexing 8 users at SCPIR=0 dB, and 2-4 users can still be multiplexed at a SCPIR of −10 dB, keeping the SNR degradation <1 dB at 10% block error rate (BLER).

Hadamard Transform

The disclosed techniques are described herein with reference to the Hadamard transform, but any orthogonal transform may be used. For example, the Discrete Fourier Transform (DFT) can also be employed. The description of the Hadamard transform given in the aforementioned co-assigned U.S. Publication No. 2013/0272273 A1 is reproduced below, for reference. The Hadamard transform is an orthogonal transformation. It is usually defined in matrix form. For any integer n≥0, $H_n$ is a matrix of dimension $2^n \times 2^n$ defined by the recursion:

$$H_0 = [1],$$
$$H_n = \begin{bmatrix} H_{n-1} & H_{n-1} \\ H_{n-1} & -H_{n-1} \end{bmatrix}, n > 0.$$

For example, $$H_1 = \begin{bmatrix} 1 & 1 \\ 1 & -1 \end{bmatrix}$$

$$H_2 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

$$H_3 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

Note that $H_n \cdot H_n = 2^n \cdot I$, where I denotes the identity matrix. The entry in the $k^{th}$ row and the $m^{th}$ column of the Hadamard matrix shall be denoted $H_n(k,m)$, $1 \leq k, m \leq 2^n$.

In view of the foregoing, it should be appreciated that the air interface in existing radio access technologies used in cellular systems, such as GSM, WCDMA, and LTE, rely on TDMA in order to divide and allocate time among the users of the system. The TDMA structure provides a frame structure in time. The time resources are divided into basic units, which are grouped into larger units, and these larger units may in turn be grouped into even larger units. For example, in GSM the basic division of time is called a TS, and eight TSs are grouped into one TDMA frame. In LTE, there are also TSs, where two TSs are grouped into one sub-frame, and ten sub-frames constitute one TDMA frame.

For the purposes of the techniques disclosed herein, the basic units of time are grouped into blocks, each block containing one or more basic time division units. The same block is transmitted several times, after applying a constant time shift to each of the blocks. This means that the whole signal corresponding to one block is phase shifted. The number of block repetitions is known at both the transmitter and the receiver. In addition, each block repetition is phase shifted by a constant phase shift, the phase shift corresponding, generally, to a different entry in a row (or column) of an orthogonal matrix. Furthermore, the transmitter and receiver circuitry should generally not introduce any additional phase shifts. For example, the GSM standard allows the transmitter to apply random phase shifts in each TS. Such phase shifts should generally not be used with the disclosed techniques. At the receiver side, the received blocks are buffered. A phase shift equal to the negative of the phase shift used at the transmitter is applied to each received block. After all the block repetitions have been received, the blocks are combined by addition of the received in-phase and quadrature (I, Q) samples. In other words, after the phase shift, the raw received digital samples from each block are added.

Thus, with the disclosed techniques, coverage may be improved by 10*log 10(N), where N is the number of repetitions. The application of the phase shifts at the transmitter and receiver allows the same radio resource (e.g., channel) to be used by several users simultaneously. The disclosed techniques are especially useful when the coherence time of the radio channel is of the same order of magnitude as the total time needed for the transmission of all the block repetitions. Using the optional multi-rate extension, users can be divided into different rate classes with different SNR gain.

The techniques disclosed herein are technology agnostic. It should be understood that overlaying a CDMA structure on top of the TDMA structure of existing radio access technologies, such as GSM, LTE, or WCDMA, for example, is unlike the CDMA techniques used in cellular systems such as Interim Standard 95 (IS-95) or WCDMA. In the present disclosure the orthogonal spreading code is not applied to modulation symbols, but applied to blocks of already modulated signals, with each block containing many modulation symbols modulated using any technology-specific modulation or even non-linearly modulated, as in GSM. Further, it should be understood that the increase in computational complexity due to the application of the techniques disclosed herein is negligible.

Further, the techniques disclosed herein have many other advantages some of which are as follows:

Multiple users can be multiplexed using the same physical resource without any inter-user interference and without increasing receiver complexity.

The coverage gain of block repetition is achieved without sacrificing capacity.

The CDMA overlay technique is compatible with any radio interface with a block structure in time, such as GSM/Enhanced Data rates for GSM Evolution (EDGE), Wideband CDMA (WCDMA), or LTE, for example. The CDMA overlay technique allows coverage extension of existing radio access technologies such as GSM, WCDMA, or LTE without losing capacity.

The CDMA overlay technique is, to a very large extent, backwards compatible with existing radio access technologies. Thus, with some software updates to the base stations and user equipment, and some additions to the air interface, existing technologies can be enhanced to provide new services. This is relevant, for example, to MTC, as it may be more economically sound to introduce enhancements to existing modem designs and to re-use already deployed networks than to deploy whole new radio access technologies for MTC.

The implementation complexity for the CDMA overlay technique is negligible. Thus, the techniques may be easily implemented in legacy systems.

Compared to some other techniques that simultaneously multiplexes users on the same physical resource, the CDMA overlay technique does not require channel diversity or orthogonal training/pilot sequences.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A wireless access node configured to communicate over a physical channel with a plurality of wireless devices, the wireless access node comprising:
    a processor; and
    a memory that stores processor-executable instructions, wherein the processor interfaces with the memory to execute the processor-executable instructions, whereby the wireless access node is operable to:
        obtain, for each of the plurality of wireless devices, code bits;
        generate, for each of the plurality of wireless devices, a baseband signal using the code bits;
        divide, for each of the plurality of wireless devices, the baseband signal into a plurality of blocks, wherein each block contains one or more time division units;
        repeat, for at least one of the plurality of wireless devices assigned a user rate $r_N$, N times each block of the plurality of blocks to generate a plurality of sequences of N repeated blocks, wherein the N is a number of repetitions;
        repeat, for at least one of the plurality of wireless devices assigned a user rate $r_A$, A times each block of the plurality of blocks to generate a plurality of sequences of A repeated blocks, wherein the A is a number of repetitions;
        multiply, for each of the plurality of wireless device, each of the plurality of sequences of the N repeated blocks and the A repeated blocks by a code word of length N selected from a set of orthogonal code words to generate a plurality of sequences, wherein at least one of the code words of length N is not selected from the set of orthogonal code words to maintain orthogonality between the plurality of sequences of the multiplied N repeated blocks and the multiplied A repeated blocks of the plurality of wireless devices which have different user rates $r_A$ and $r_N$; and
        transmit, for each of the plurality of wireless devices, the plurality of sequences of the multiplied N repeated blocks and the multiplied A repeated blocks.

2. The wireless access node of claim 1, wherein the wireless access node is operable to generate, for each of the plurality of wireless devices, the baseband signal according to modulation and formatting requirements specific to a radio access technology used to enable the wireless access node to communicate over the physical channel with the plurality of wireless devices.

3. The wireless access node of claim 1, wherein:
    each block contains one or more Global System for Mobile Communications (GSM) time slot (TS);
    each block corresponds to a Long-Term Evolution (LTE) sub-frame and contains two LTE TSs; or
    each block corresponds to one LTE frame and contains ten LTE sub-frames.

4. The wireless access node of claim 1, wherein the wireless access node is operable to multiply each of the plurality of sequences of the N repeated blocks and the A repeated blocks by the code word of length N selected from the set of orthogonal code words by using a specific row or column in a Hadamard matrix or a Discrete Fourier Transform (DFT) matrix to apply a constant phase shift to each block in the sequences of the N repeated blocks and the A repeated blocks.

5. The wireless access node of claim 1, wherein the wireless access node is operable to perform each of the multiply operations such that each of the plurality of the wireless devices is assigned its own unique code word of length N selected from the set of orthogonal code words.

6. A wireless access node configured to communicate over a physical channel with a plurality of wireless devices, the wireless access node comprising:
    a processor; and
    a memory that stores processor-executable instructions, wherein the processor interfaces with the memory to execute the processor-executable instructions, whereby the wireless access node is operable to:
        obtain, for each of the plurality of wireless devices, code bits;
        generate, for each of the plurality of wireless devices, a baseband signal using the code bits;
        divide, for each of the plurality of wireless devices, the baseband signal into a plurality of blocks, wherein each block contains one or more time division units;

repeat, for each of the plurality of wireless devices, N times each block of the plurality of blocks to generate a plurality of sequences of N repeated blocks, wherein the N is a number of repetitions;

multiply, for each of the plurality of wireless devices, each of the plurality of sequences of the N repeated blocks by a code word of length N selected from a set of orthogonal code words to generate a plurality of sequences of the multiplied N repeated blocks; and transmit, for each of the plurality of wireless devices, the plurality of sequences of the multiplied N repeated blocks such that at least one of the plurality of sequences of the multiplied N repeated blocks is transmitted at one amplitude to at least one of the plurality of the wireless devices and that at least one of the plurality of sequences of the multiplied N repeated blocks is transmitted at another amplitude to at least one of the plurality of the wireless devices.

7. A method in a wireless access node configured for communicating over a physical channel with a plurality of wireless devices, the method comprising:

obtaining, for each of the plurality of wireless devices, code bits;

generating, for each of the plurality of wireless devices, a baseband signal using the code bits;

dividing, for each of the plurality of wireless devices, the baseband signal into a plurality of blocks, wherein each block contains one or more time division units;

repeating, for at least one of the plurality of wireless devices assigned a user rate $r_N$, N times each block of the plurality of blocks to generate a plurality of sequences of N repeated blocks, wherein the N is a number of repetitions;

repeating, for at least one of the plurality of wireless devices assigned a user rate $r_A$, A times each block of the plurality of blocks to generate a plurality of sequences of A repeated blocks, wherein the A is a number of repetitions;

multiplying, for each of the plurality of wireless device, each of the plurality of sequences of the N repeated blocks and the A repeated blocks by a code word of length N selected from a set of orthogonal code words to generate a plurality of sequences, wherein at least one of the code words of length N is not selected from the set of orthogonal code words to maintain orthogonality between the plurality of sequences of the multiplied N repeated blocks and the multiplied A repeated blocks of the plurality of wireless devices which have different user rates $r_A$ and $r_N$; and transmitting, for each of the plurality of wireless devices, the plurality of sequences of the multiplied N repeated blocks and the multiplied A repeated blocks.

8. The method of claim 7, wherein the generating step further comprises generating, for each of the plurality of wireless devices, the baseband signal according to modulation and formatting requirements specific to a radio access technology used to enable the wireless access node to communicate over the physical channel with the plurality of wireless devices.

9. The method of claim 7, wherein:

each block contains one or more Global System for Mobile Communications (GSM) time slot (TS);

each block corresponds to a Long-Term Evolution (LTE) sub-frame and contains two LTE TSs; or each block corresponds to one LTE frame and contains ten LTE sub-frames.

10. The method of claim 7, wherein the multiplying step comprises using a specific row or column in a Hadamard matrix or a Discrete Fourier Transform (DFT) matrix to apply a constant phase shift to each block in the sequences of the N repeated blocks and the A repeated blocks.

11. The method of claim 7, wherein the wireless access node is configured for performing each of the multiplying steps such that each of the plurality of the wireless devices is assigned its own unique code word of length N selected from the set of orthogonal code words.

12. A method in a wireless access node configured for communicating over a physical channel with a plurality of wireless devices, the method comprising:

obtaining, for each of the plurality of wireless devices, code bits;

generating, for each of the plurality of wireless devices, a baseband signal using the code bits;

dividing, for each of the plurality of wireless devices, the baseband signal into a plurality of blocks, wherein each block contains one or more time division units;

repeating, for each of the plurality of wireless devices, N times each block of the plurality of blocks to generate a plurality of sequences of N repeated blocks, wherein the N is a number of repetitions;

multiplying, for each of the plurality of wireless devices, each of the plurality of sequences of the N repeated blocks by a code word of length N selected from a set of orthogonal code words to generate a plurality of sequences of the multiplied N repeated blocks; and transmitting, for each of the plurality of wireless devices, the plurality of sequences of the multiplied N repeated blocks such that at least one of the plurality of sequences of the multiplied N repeated blocks is transmitted at one amplitude to at least one of the plurality of the wireless devices and that at least one of the plurality of sequences of the multiplied N repeated blocks is transmitted at another amplitude to at least one of the plurality of the wireless devices.

* * * * *